US010853123B2

(12) United States Patent
Tachibana

(10) Patent No.: US 10,853,123 B2
(45) Date of Patent: Dec. 1, 2020

(54) MEMORY MODULE

(71) Applicant: RENESAS ELECTRONICS CORPORATION, Tokyo (JP)

(72) Inventor: Tatsuhiro Tachibana, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/433,860

(22) Filed: Jun. 6, 2019

(65) Prior Publication Data

US 2019/0391840 A1 Dec. 26, 2019

(30) Foreign Application Priority Data

Jun. 21, 2018 (JP) ................................ 2018-117712

(51) Int. Cl.

*G06F 13/00* (2006.01)
*G06F 9/46* (2006.01)
*G06F 13/16* (2006.01)
*G06F 13/18* (2006.01)
*G06F 13/24* (2006.01)

(52) U.S. Cl.

CPC .......... *G06F 9/462* (2013.01); *G06F 13/1673* (2013.01); *G06F 13/1678* (2013.01); *G06F 13/1684* (2013.01); *G06F 13/18* (2013.01); *G06F 13/24* (2013.01)

(58) Field of Classification Search

CPC ...... G06F 13/00; G06F 9/462; G06F 13/1673; G06F 13/1678; G06F 13/1684; G06F 13/18; G06F 13/24
USPC .......................... 710/107, 105, 305; 718/108
See application file for complete search history.

(56) References Cited

U.S. PATENT DOCUMENTS 6,275,749 B1 8/2001 Saville et al.
2006/0101252 A1 5/2006 Tomisawa
2007/0022428 A1 * 1/2007 Yamasaki ............ G06F 9/3851 718/108
2013/0019053 A1 * 1/2013 Somanache ......... G06F 13/1684 711/103

FOREIGN PATENT DOCUMENTS

JP 2013-164791 A 8/2013
WO 2014/159123 A1 10/2014

OTHER PUBLICATIONS

Extended European Search Report issued in corresponding European Patent Application No. 19181235.3-1224, dated Feb. 24, 2020.

* cited by examiner

*Primary Examiner* — Tim T Vo
*Assistant Examiner* — Kim T Huynh
(74) *Attorney, Agent, or Firm* — McDermott Will & Emery LLP

(57) ABSTRACT

The access control circuit writes to the first storage unit a context information transmitted in one cycle from the CPU through the first bus, a context number identifying the context information, and a link context number identifying the context information transmitted from the CPU prior to the interrupt when the request for evacuating the task context information is received by the interrupt. After writing to the first storage unit, the access control circuit transfers the data including the context information and the link context number stored in the first storage unit to the second storage unit in a plurality of cycles through the internal bus (second bus) in association with the context number stored in the first storage unit.

16 Claims, 25 Drawing Sheets

| | | |
|---|---|---|
| BUFFER (0) | CONTEXT NUMBER | |
| BUFFER (1) | LINK CONTEXT NUMBER | SUB-CONTEXT INFORMATION (1) |
| BUFFER (2) | SUB-CONTEXT INFORMATION (2) | |
| BUFFER (3) | SUB-CONTEXT INFORMATION (3) | |
| ⋮ | ⋮ | |
| BUFFER (n-1) | SUB-CONTEXT INFORMATION (n-1) | |

FIG. 4

| ADDRESS | STORAGE DATA | |
|---|---|---|
| ADD(1) | SUB-CONTEXT INFORMATION (0) | |
| | LINK CONTEXT NUMBER | SUB-CONTEXT INFORMATION (1) |
| | SUB-CONTEXT INFORMATION (2) | |
| | SUB-CONTEXT INFORMATION (3) | |
| | ⋮ | |
| | SUB-CONTEXT INFORMATION (n-1) | |

| ADDRESS | STORAGE DATA | |
|---|---|---|
| ADD(2) | SUB-CONTEXT INFORMATION (0) | |
| | LINK CONTEXT NUMBER | SUB-CONTEXT INFORMATION (1) |
| | SUB-CONTEXT INFORMATION (2) | |
| | SUB-CONTEXT INFORMATION (3) | |
| | ⋮ | |
| | SUB-CONTEXT INFORMATION (n-1) | |

| ADDRESS | STORAGE DATA | |
|---|---|---|
| ADD(3) | SUB-CONTEXT INFORMATION (0) | |
| | LINK CONTEXT NUMBER | SUB-CONTEXT INFORMATION (1) |
| | SUB-CONTEXT INFORMATION (2) | |
| | SUB-CONTEXT INFORMATION (3) | |
| | ⋮ | |
| | SUB-CONTEXT INFORMATION (n-1) | |

| ADDRESS | STORAGE DATA | |
|---|---|---|
| ADD(4) | SUB-CONTEXT INFORMATION (0) | |
| | LINK CONTEXT NUMBER | SUB-CONTEXT INFORMATION (1) |
| | SUB-CONTEXT INFORMATION (2) | |
| | SUB-CONTEXT INFORMATION (3) | |
| | ⋮ | |
| | SUB-CONTEXT INFORMATION (n-1) | |

FIG. 16

| | |
|---|---|
| BUFFER (0) | CONTEXT NUMBER |
| BUFFER (1) | SUB-CONTEXT INFORMATION (1) |
| BUFFER (2) | SUB-CONTEXT INFORMATION (2) |
| BUFFER (3) | SUB-CONTEXT INFORMATION (3) |
| . . . | . . . |
| BUFFER (n-1) | SUB-CONTEXT INFORMATION (n-1) |

FIG. 25A

| | |
|---|---|
| BUFFER (1-0) | CONTEXT NUMBER (1) |
| BUFFER (1-1) | LINK CONTEXT NUMBER OF CONTEXT NUMBER (1) + SUB-CONTEXT INFORMATION (1) |
| BUFFER (1-2) | SUB-CONTEXT INFORMATION (2) OF CONTEXT NUMBER (1) |
| BUFFER (1-3) | SUB-CONTEXT INFORMATION (3) OF CONTEXT NUMBER (1) |
| BUFFER (2-0) | |
| BUFFER (2-1) | |
| BUFFER (2-2) | |
| BUFFER (3-0) | |
| BUFFER (3-1) | |

FIG. 25B

| | |
|---|---|
| BUFFER (1-0) | CONTEXT NUMBER (2) |
| BUFFER (1-1) | LINK CONTEXT NUMBER OF CONTEXT NUMBER (2) + SUB-CONTEXT INFORMATION (1) |
| BUFFER (1-2) | SUB-CONTEXT INFORMATION (2) OF CONTEXT NUMBER (2) |
| BUFFER (1-3) | SUB-CONTEXT INFORMATION (3) OF CONTEXT NUMBER (2) |
| BUFFER (2-0) | CONTEXT NUMBER (1) |
| BUFFER (2-1) | LINK CONTEXT NUMBER OF CONTEXT NUMBER (1) + SUB-CONTEXT INFORMATION (1) |
| BUFFER (2-2) | SUB-CONTEXT INFORMATION (2) OF CONTEXT NUMBER (1) |
| BUFFER (3-0) | |
| BUFFER (3-1) | |

FIG. 25C

| | |
|---|---|
| BUFFER (1-0) | CONTEXT NUMBER (3) |
| BUFFER (1-1) | LINK CONTEXT NUMBER OF CONTEXT NUMBER (3) + SUB-CONTEXT INFORMATION (1) |
| BUFFER (1-2) | SUB-CONTEXT INFORMATION (2) OF CONTEXT NUMBER (3) |
| BUFFER (1-3) | SUB-CONTEXT INFORMATION (3) OF CONTEXT NUMBER (3) |
| BUFFER (2-0) | CONTEXT NUMBER (2) |
| BUFFER (2-1) | LINK CONTEXT NUMBER OF CONTEXT NUMBER (2) + SUB-CONTEXT INFORMATION (1) |
| BUFFER (2-2) | SUB-CONTEXT INFORMATION (2) OF CONTEXT NUMBER (2) |
| BUFFER (3-0) | CONTEXT NUMBER (1) |
| BUFFER (3-1) | LINK CONTEXT NUMBER OF CONTEXT NUMBER (1) + SUB-CONTEXT INFORMATION (1) |

FIG. 25D

| | |
|---|---|
| BUFFER (1-0) | CONTEXT NUMBER (4) |
| BUFFER (1-1) | LINK CONTEXT NUMBER OF CONTEXT NUMBER (4) + SUB-CONTEXT INFORMATION (1) |
| BUFFER (1-2) | SUB-CONTEXT INFORMATION (2) OF CONTEXT NUMBER (4) |
| BUFFER (1-3) | SUB-CONTEXT INFORMATION (3) OF CONTEXT NUMBER (4) |
| BUFFER (2-0) | CONTEXT NUMBER (3) |
| BUFFER (2-1) | LINK CONTEXT NUMBER OF CONTEXT NUMBER (3) + SUB-CONTEXT INFORMATION (1) |
| BUFFER (2-2) | SUB-CONTEXT INFORMATION (2) OF CONTEXT NUMBER (3) |
| BUFFER (3-0) | CONTEXT NUMBER (2) |
| BUFFER (3-1) | LINK CONTEXT NUMBER OF CONTEXT NUMBER (2) + SUB-CONTEXT INFORMATION (1) |

MEMORY MODULE

CROSS-REFERENCE TO RELATED APPLICATIONS

The disclosure of Japanese Patent Application No. 2018-117712 filed on Jun. 21, 2018 including the specification, drawings and abstract is incorporated herein by reference in its entirety.

BACKGROUND

The present invention relates to a memory module, for example, to a control technique for a memory module for saving a context.

A CPU having the function of a context switch has a plurality of register banks for storing context information. The CPU switches the task to be executed by switching the register bank to be referred to. When the number of tasks to be executed is larger than the number of implemented register banks, it is necessary to perform context saving processing and restoration processing between the register banks and the external memory. For example, JP-A-2013-164791 describes a technique for speeding up the context saving process and the context restoring process. In JP-A-2013-164791, context information (link context information) that is likely to be executed after a task being executed is handled as a part of the context information. The link context of the context information of the currently executing task is used to store the context that is likely to be executed in the register bank. Next, when the CPU executes a new task, it is only necessary to switch the register bank to be referred to when executing the assumed task, so that the context switch can be performed at high speed.

SUMMARY

However, in Patent Document 1, it is necessary to know the task that is likely to occur next. In the interrupt processing, it is difficult to know the task which is likely to occur next because the task which is not related to the currently executed task is executed next. Therefore, in preparation for an interrupt, the context information of the task to be executed after the interrupt cannot be held in the register bank. As a result, it takes time to recover the context information upon recovery from the interrupt.

In the memory module of the embodiment, when the access control circuit receives a request to save the context information of the task by an interrupt, the access control circuit writes the context information transferred from the CPU in one cycle through the first bus, the context number identifying the context information, and the link context number identifying the context information transferred from the CPU in the preceding interrupt to the first storage unit.

According to the memory module of the embodiment, the context information can be returned in a short time at the time of return from the interrupt.

BRIEF DESCRIPTION OF THE DRAWINGS

FIG. 4 shows the data stored in the RAM160.

FIG. 16 is a diagram showing information stored in an extended buffer group 250 according to the third embodiment.

FIG. 25A thru FIG. 25D show diagrams representing data stored in the buffer group 150 by context evacuation when the interrupt (1), the interrupt (2), the interrupt (3), and the interrupt (4) shown in FIG. 12 occur.

DETAILED DESCRIPTION

Embodiments will be described below with reference to the drawings.

First Embodiment

Figure 1:
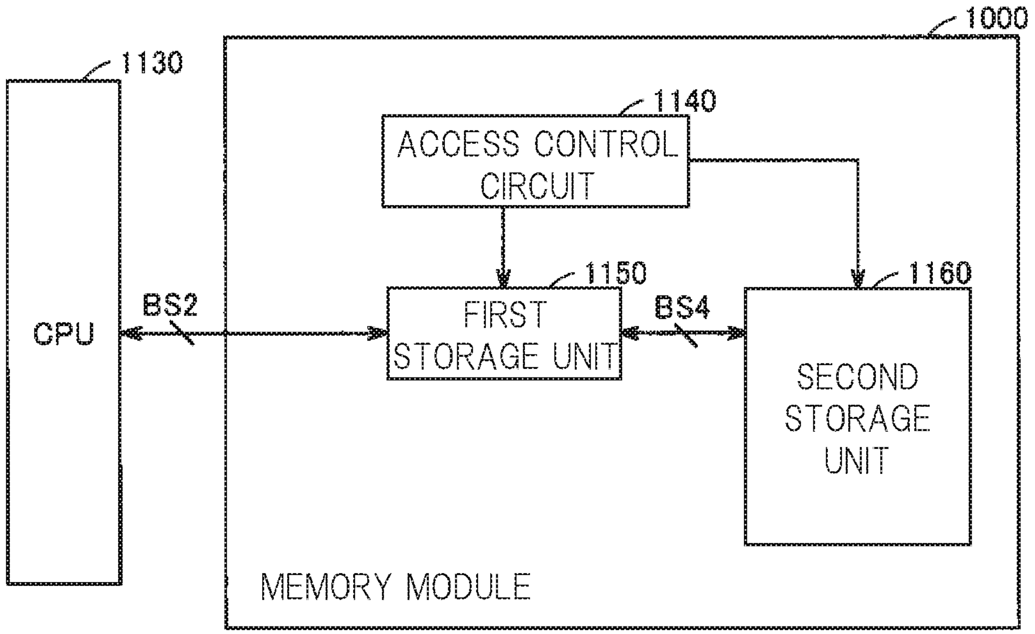
FIG. 1 is a diagram illustrating a configuration of a memory module 1000 according to a first embodiment.

FIG. 1 is a diagram showing a configuration of a memory module 1000 according to a first embodiment. The memory module 1000 includes an access control circuit 1140, a first storage unit 1150, and a second storage unit 1160. The first storage unit 1150 is connected to the CPU 1130 via a first bit-width bus BS 2. The second storage unit 1160 is connected to the first storage unit 1150 through an internal bus BS 4 having a second bit width smaller than the first bit width. The access control circuit 1140 writes to the first storage unit 1150 context information to be transmitted in one cycle from the CPU 1130 through the bus BS2 upon receiving a request to evacuate the task context information due to an interrupt. The access control circuit 1140 further writes the context number identifying the context information and the link context number identifying the context information transferred from the CPU 1130 prior to the interrupt to the first storage circuit 1150. After writing to the first storage unit 1150, the access control circuit 1140 transfers the data including the context information and the link context number stored in the first storage unit 1150 to the second storage unit 1160 in a plurality of cycles through the internal bus BS 4 in association with the context number stored in the first storage unit 1150.

As described above, according to the present embodiment, since the link context number for identifying the context information transferred from the CPU before the interrupt is written to the buffer group at the time of saving the context information by the interrupt, the context information can be restored in a short time at the time of restoring from the interrupt.

Second Embodiment

Figures 2, 3:
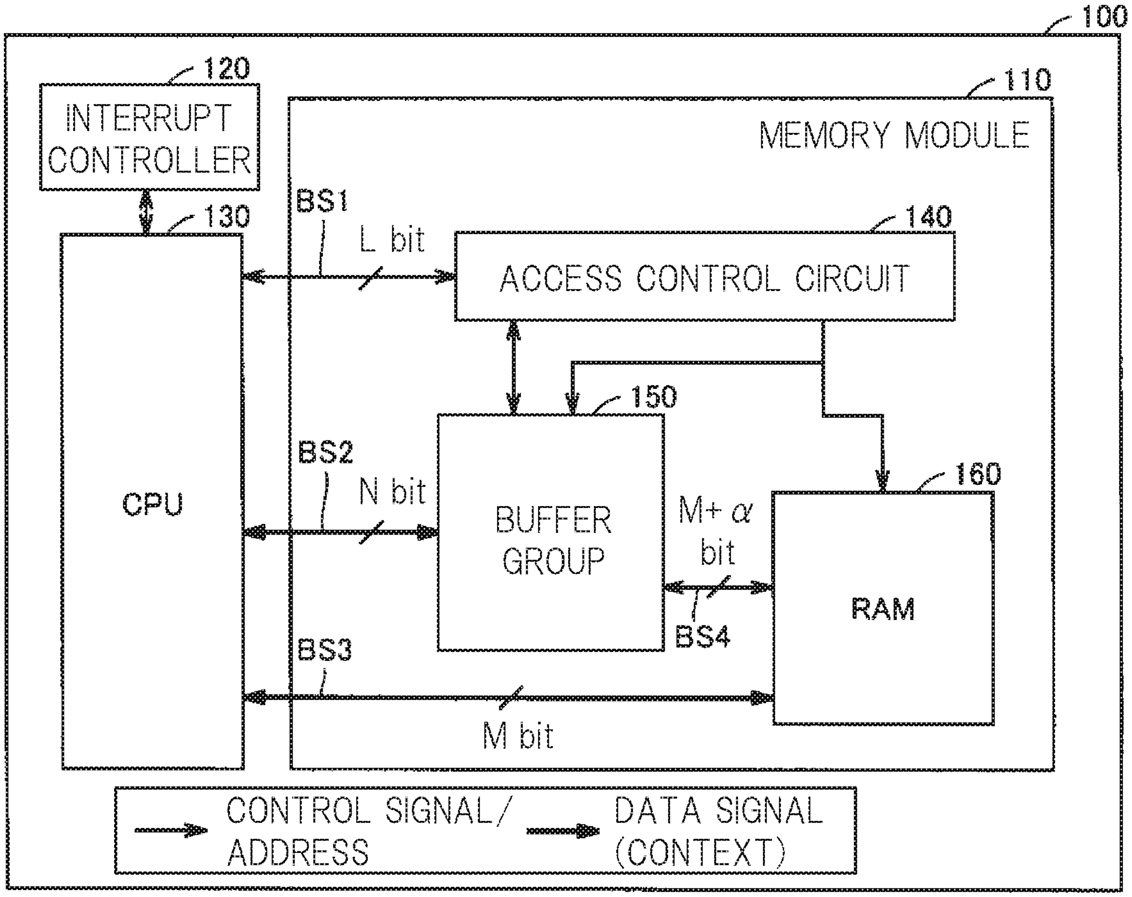
FIG. 2 is a diagram illustrating a configuration of a semiconductor device 100 according to a second embodiment.
FIG. 3 shows the data stored in the buffer group 150 of the second embodiment.

FIG. 2 is a diagram showing a configuration of a semiconductor device 100 according to a second embodiment.

The semiconductor device 100 includes an interrupt controller 120, a Central Processing Unit 130, and a memory module 110.

The interrupt controller 120 controls an interrupt process by the CPU 130. The CPU 130 does not have a register bank to hold the context of a plurality of tasks as described in Patent Document 1. The CPU 130 has a register for holding the context of one task. In the context saving operation due to the generation of the interrupt, the CPU 130 outputs the context information and the context number for identifying the context information to the memory module 110. The memory module 110 stores the context information and the context number saved from the CPU 130 by the generation of the interrupt, and transfers the stored context information to the CPU 130 at the time of the subsequent return. The CPU 130 rewrites the register with the context information transferred from the memory module 110.

The context saving refers to transferring context information from the CPU 130 to the memory module 110. The context return refers to transferring context data from the memory module 110 to the CPU 130.

The memory module 110 includes an access control circuit 140, a group of buffers 150, and a random access memory (Random Access Memory) 160.

The CPU 130 and the access control circuit 140 are connected to each other by a bus BS 1 having a length of L bits. The CPU 130 and the buffer group 150 are connected by a bus BS 2 having a width of N bits. The CPU 130 and the RAM 160 are connected by a bus BS 3 having a width of M bits. Buffers 150 and RAM 160 are connected by an M+α-bit wide inner bus BS 4. Where $L<M<N$. Alternatively, $N=(n-1)\times M$ may be used.

The access control circuit 140 receives the context saving request SREQ and the context restoring request RREQ from the CPU 130 through the bus BS 1, and controls the buffers 150 and the RAM 160 based on these requests.

The contextual information includes the values of program counters in the CPU 130 indicating the status in which tasks are being executed, addresses, data, or startups held in registers in the CPU 130, and the like. The context information is divided into n pieces of M-bit sub-context information (0) to (n−1).

The sub-context data (0) is transferred from the CPU 130 to the RAM 160 via the bus BS 3. The sub-context data (0) is transferred from the RAM 160 to the CPU 130 via the bus BS 3.

The sub-context information (1) to (n−1) is transferred from the CPU 130 to the buffers 150 through the buses BS2 in one cycle. The sub-context information (1) to (n−1) is transferred from the buffer group 150 to the CPU 130 via the bus BS 2 in one cycle.

From the group of buffers 150, the sub-context information (1) and the link context number are transferred to the RAM 160 in one cycle, and the sub-context information (i) (i=2 to (n−1)) is sequentially transferred in one cycle.

FIG. 3 is a diagram showing data stored in the buffer group 150 according to the second embodiment. The buffer group 150 includes n buffers (0) to (n−1). The buffers (0) to (n−1) have an area in which data of (M+α) bits can be stored. That is, the buffer group 150 has a size of $n\times(M+\alpha)$ bits.

The buffer (0) stores a context number. The context number is a number for identifying context information. The link context number and the sub-context information (1) are stored in the buffer (1). The link context number is an identifier for identifying context information that has been transferred from the CPU 130 one time ago and stored in the group of buffers 150. When no context saving has occurred, the context number and the link context number retain invalid values. Sub-context information (2) to sub-context information (n−1) are stored in the buffers (2) to (n−1). The link context number may be held in a buffer other than the buffer (1).

In the following description, the context number, the link context number, and the sub-context information (1) to (n−1) stored in the buffer group 150 may be referred to as context data.

FIG. 4 is a diagram showing data stored in the RAM 160. The RAM 160 stores all the context information transferred from the CPU 130 directly or through the buffer group 150 after the program starts executing the program, and the link context number transferred from the buffer group 150. RAM 160 addresses correspond to contextual numbers.

In the case of FIG. 4, the address ADD(k) of the RAM 160 is the address corresponding to the context number=k.

Context information (sub-context information (0) to (n−1)) of context number=k and link context number are stored in a block of $n\times(M+\alpha)$ bits starting from address ADD(k).

The block of $n\times(M+\alpha)$ bits is divided into n $(M+\alpha)$ bits of regions 0 to (n−1). The sub-context data (0) transferred from the CPU 130 is stored in the first area 0. The link context number and the sub-context information (1) transferred from the buffer (1) of the buffer group 150 are stored in the second area 1. The sub-context information (i) transferred from the buffer (i) of the buffer group 150 is stored in the region i(i>1).

The (context evacuation) access control circuit 140 writes to the buffer group 150 context information that is transferred from the CPU 130 through the bus BS 2 in one cycle and context number that identifies the context information when requested to evacuate the task context information by interrupt.

In addition, the access control circuit 140 writes the link context number, which identifies the context information transferred from the CPU 130 prior to the interruption, to the buffer group 150. Specifically, when the context number stored in the buffer group 150 before receiving the request to save is not a predetermined invalid value, the access control circuit 140 updates the link context number by the context number stored in the buffer group 150. The access control circuit 140 updates the link context number with a predetermined invalid value when the context number stored in the buffer group 150 before receiving the request to save is a predetermined invalid value.

Thereafter, the access control circuit 140 transfers the data including the context information and the link context number stored in the buffer group 150 to the RAM 160 through the internal bus BS 4 in a plurality of cycles in correspondence with the context number stored in the buffer group 150.

Figure 5:
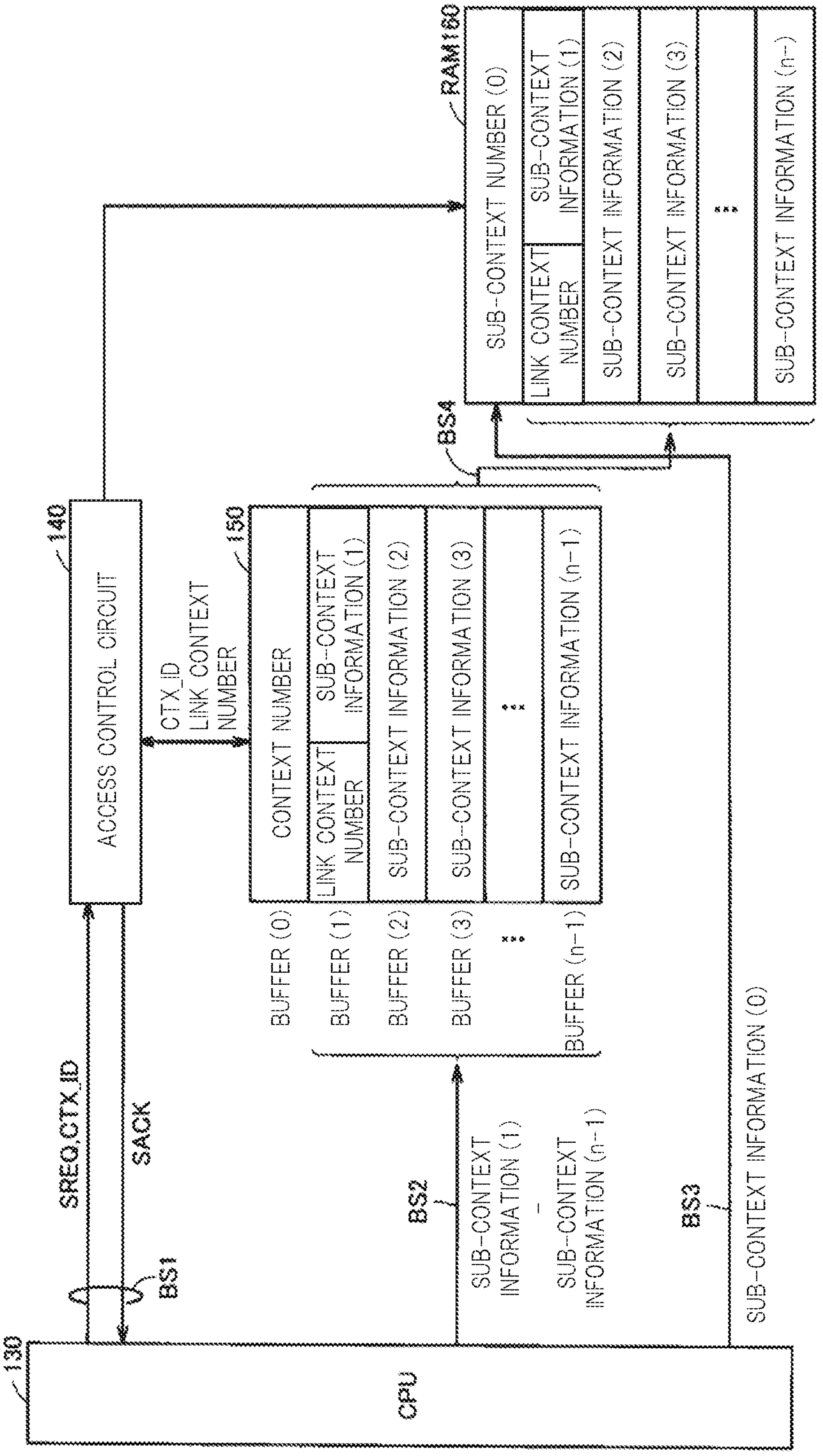
FIG. 5 is a diagram illustrating the flow of data during a context evacuation according to the second embodiment.
Figure 6:
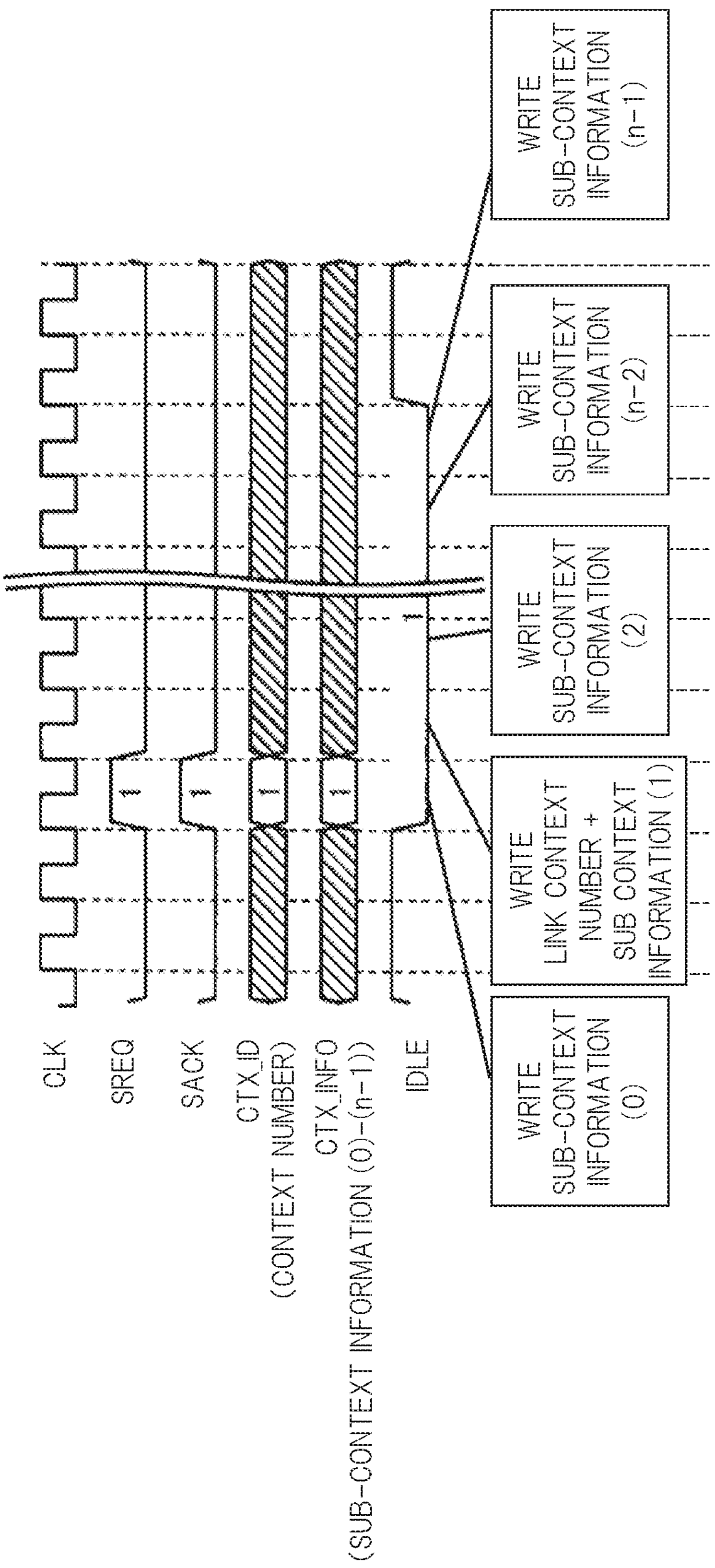
FIG. 6 is a timing chart of the context evacuation according to the second embodiment.

FIG. 5 is a diagram showing the flow of data at the time of context saving in the second embodiment. FIG. 6 is a timing chart at the time of context saving in the second embodiment. In FIG. 6, RAM 160 write periods are indicated by activation of IDLE signals.

Referring to FIGS. 5 and 6, the CPU 130 outputs a context-saving-request SREQ through the bus BS 1. Access control circuitry 140 receives a context-evacuation-request SREQ.

The access control circuit 140 outputs a context-saving acceptance SACK through the bus BS 1. The CPU 130 receives the context-saving acceptance SACK.

The CPU 130 outputs the context number CTX_ID, here "1", via the bus BS 1. The access control circuit 140 receives the context number CTX_ID.

If the context number in the buffer (0) and the link context number in the buffer (1) are invalid values, the access control circuit 140 updates the link context number in the buffer (1) with the input context number CTX_ID. If the context number in the buffer (0) and the link context number in the buffer (1) are valid values, the access control circuit 140 updates the link context number in the buffer (1) with the context number in the buffer (0). The access control circuit 140 updates the context number in the buffer (0) with the input context number CTX_ID.

The CPU 130 simultaneously outputs the sub-context information (1) to the sub-context information (n−1) to the group of buffers 150 in one cycle through the bus BS 2. At the same time, the CPU 130 outputs the sub-context data (0) to the RAM 160 in one cycle via the bus BS 3. The access control circuit 140 writes the sub-context information (1) to the sub-context information (n−1) into the buffers (1) to (n−1). The access control circuit 140 writes the sub-context information (0) in the zeroth area of the block starting from the address corresponding to the context number CTX_ID in the RAM 160.

Thereafter, the access control circuit 140 causes the access control circuit 140 to sequentially output the information stored in the buffers (1) to (n−1) to the blocks starting from the addresses corresponding to the context numbers CTX_ID in the RAM 160 in a plurality of cycles through the internal bus BS 4.

In the first cycle, the link context number and the sub-context information (1) stored in the buffer (1) are sent to the first area of the block starting from the address corresponding to the context number CTX_ID in the RAM 160. In the subsequent i th (i>2) cycles, the sub-context information (i) stored in the buffers (i) is sent to the i th area of the blocks starting from the addresses corresponding to the context numbers CTX_ID in the RAM 160.

<Context Restore>

When a request for restoring the context information evacuated by an interrupt is received from a CPU 130, the access control circuit 140 executes the following when the context number identifying the returned context information matches the context number stored in the buffer (0). The access control circuit 140 transfers the sub-context information (1) to (n−1) of the buffers (1) to (n−1) identified by the context numbers stored in the buffer (0) to the CPU 130 in one cycle through the bus BS 2.

The access control circuit 140 performs the following processing when the context number identifying the context information to be returned does not match the context number stored in the buffer (0) upon receiving a request to restore the context information evacuated by the interrupt. The access control circuit 140 updates the context number of the buffer (0) with the context number identifying the context information to be returned. The access control circuit 140 transfers the data including the sub-context information (1) to (n−1) and the link context number stored in the RAM 160 in association with the updated context number to the buffer group 150 in a plurality of cycles. The access control circuit 140 then transfers the transferred sub-context information (1) to (n−1) in the buffers (1) to (n−1) to the CPU 130 through the bus BS 2 in one cycle.

Regardless of the context number identifying the context information to be returned, the access control circuit 140 transfers the sub-context information (0) stored in the RAM 160 corresponding to the context number to the CPU 130 in one cycle through the bus BS 3.

Figure 7:
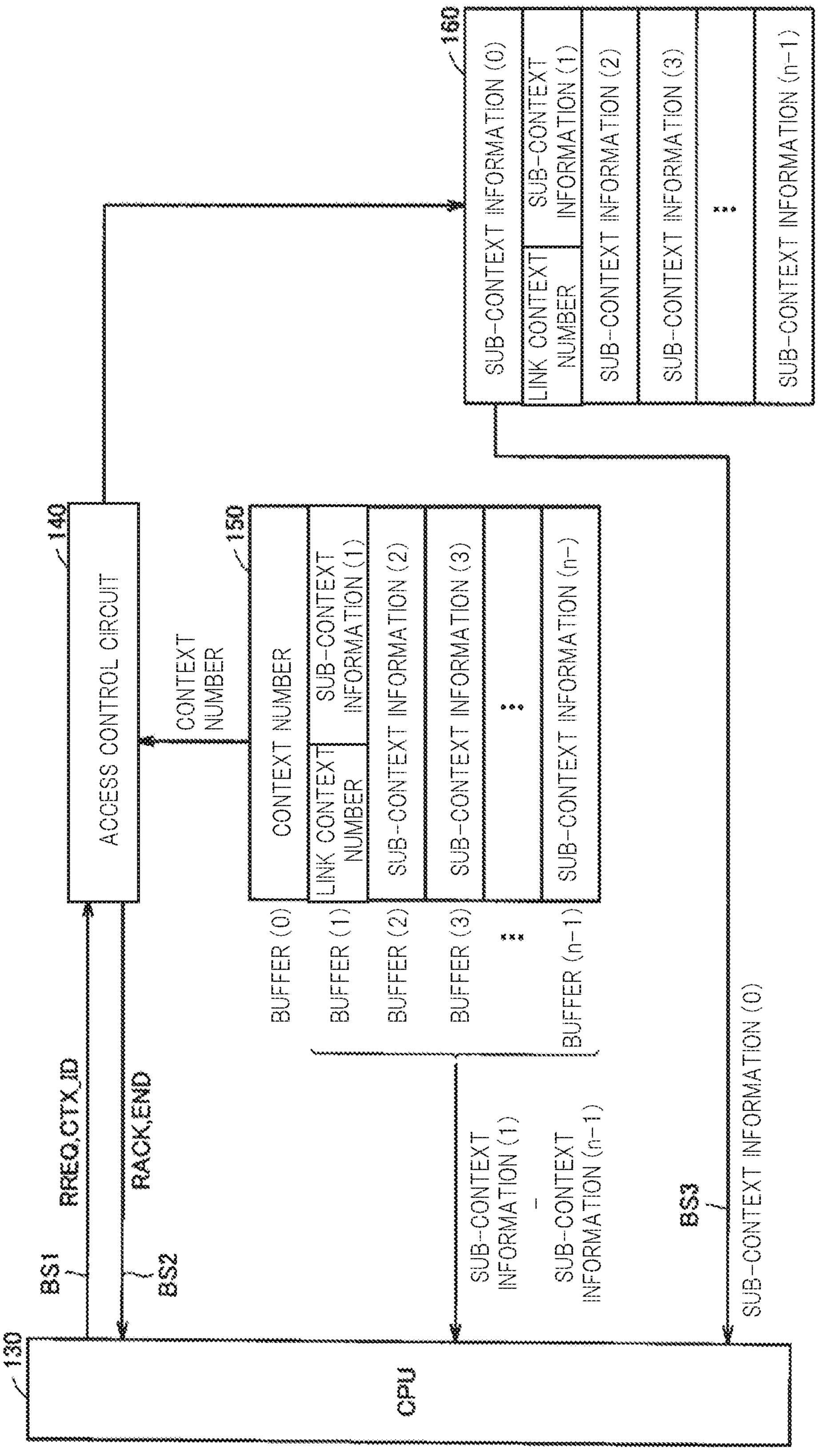
FIG. 7 is a diagram illustrating an example of a data flow during context restoration according to the second embodiment.
Figure 8:
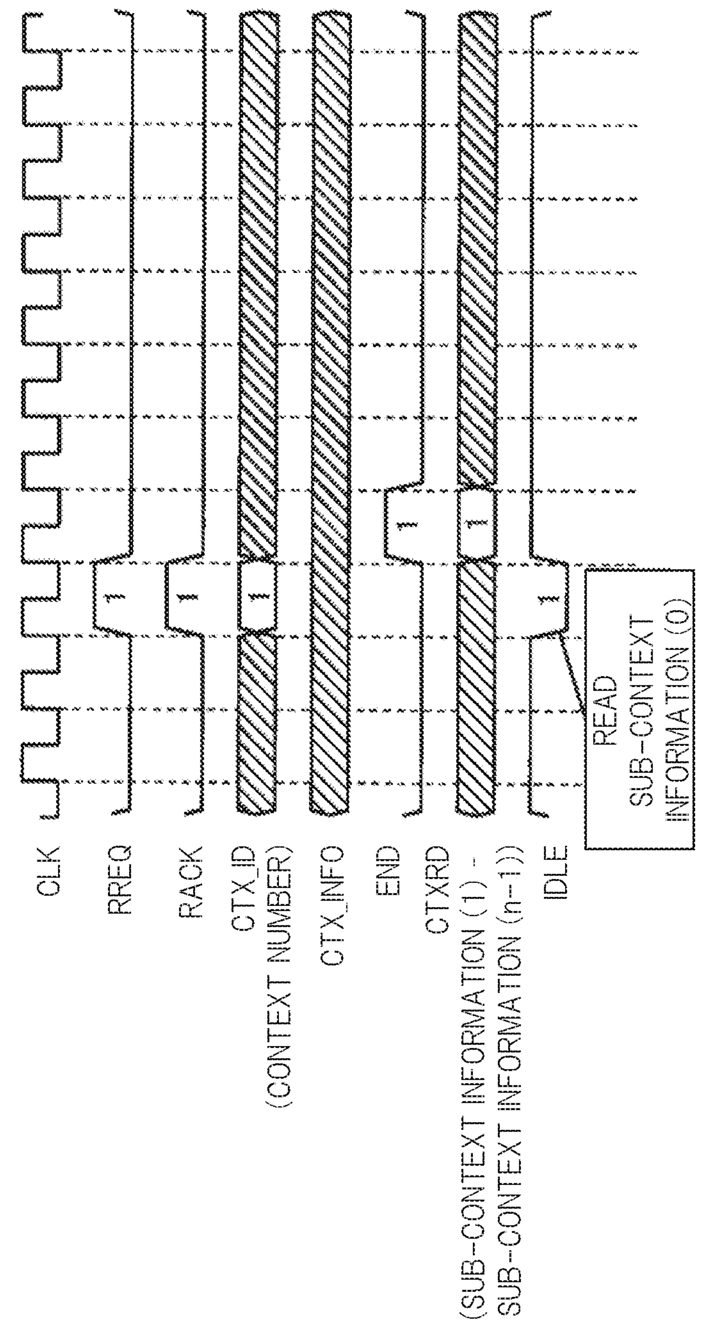
FIG. 8 is an example of a timing chart at the context reversion according to the second embodiment.

FIG. 7 is a diagram showing an example of the flow of data at the time of context return according to the second embodiment. FIG. 8 is an example of a timing chart at the time of context return according to the second embodiment. FIGS. 7 and 8 show an example in which the context number in the buffer (0) matches the input context number CTX_ID.

Referring to FIGS. 7 and 8, the CPU 130 outputs a context-return-request RREQ through the bus BS 1. Access control circuit 140 receives the context-return-request (RREQ).

The access control circuit 140 outputs a context return acceptance (RACK) through the bus BS 1. The CPU 130 receives the context return acceptance (RACK).

The CPU 130 outputs the context number CTX_ID, here "1", via the bus BS 1. The access control circuit 140 receives the context number CTX_ID.

When the context number in the buffer (0) coincides with the received context number CTX_ID, the access control circuit 140 causes RAM 160 to output the sub-context information (0) held in the 0 area of the block starting from the address corresponding to the context number CTX_ID to the CPU 130 in one cycle through the bus BS 3.

At the same time, as indicated by CTX_RD in FIG. 8, the access control circuit 140 causes the buffers (1) to (n−1) to output the sub-context information (1) to the sub-context information (n−1) to the CPU 130 in one cycle through the bus BS 2.

The access control circuit 140 outputs the context-return-end (END) through the bus BS 1 at the same time as the outputs of the sub-context information (0) to the sub-context information (n−1). The CPU 130 receives a context-return-end (END).

Figure 9:
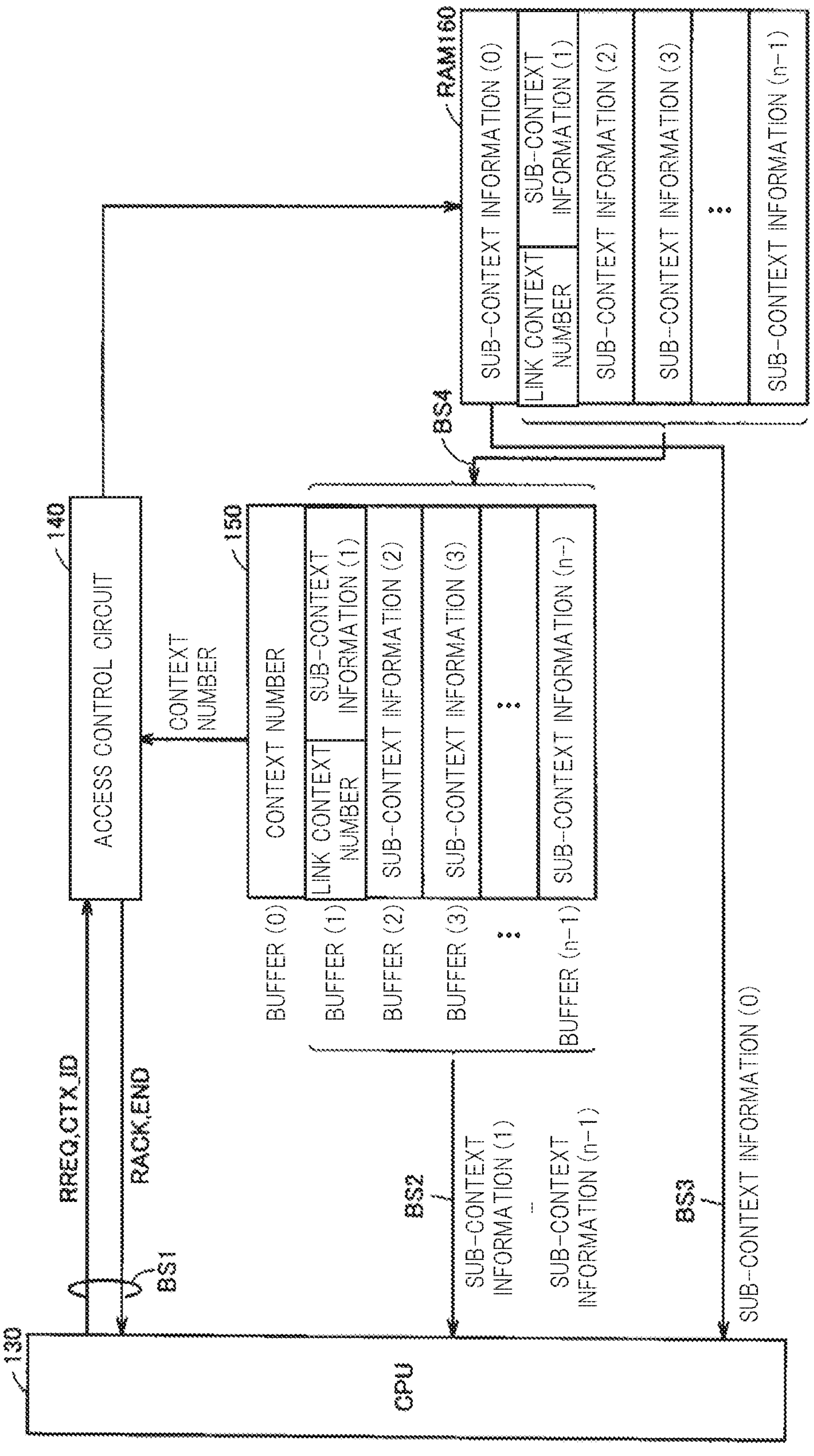
FIG. 9 is a diagram showing another example of the flow of data at the time of context return according to the second embodiment.
Figure 10:
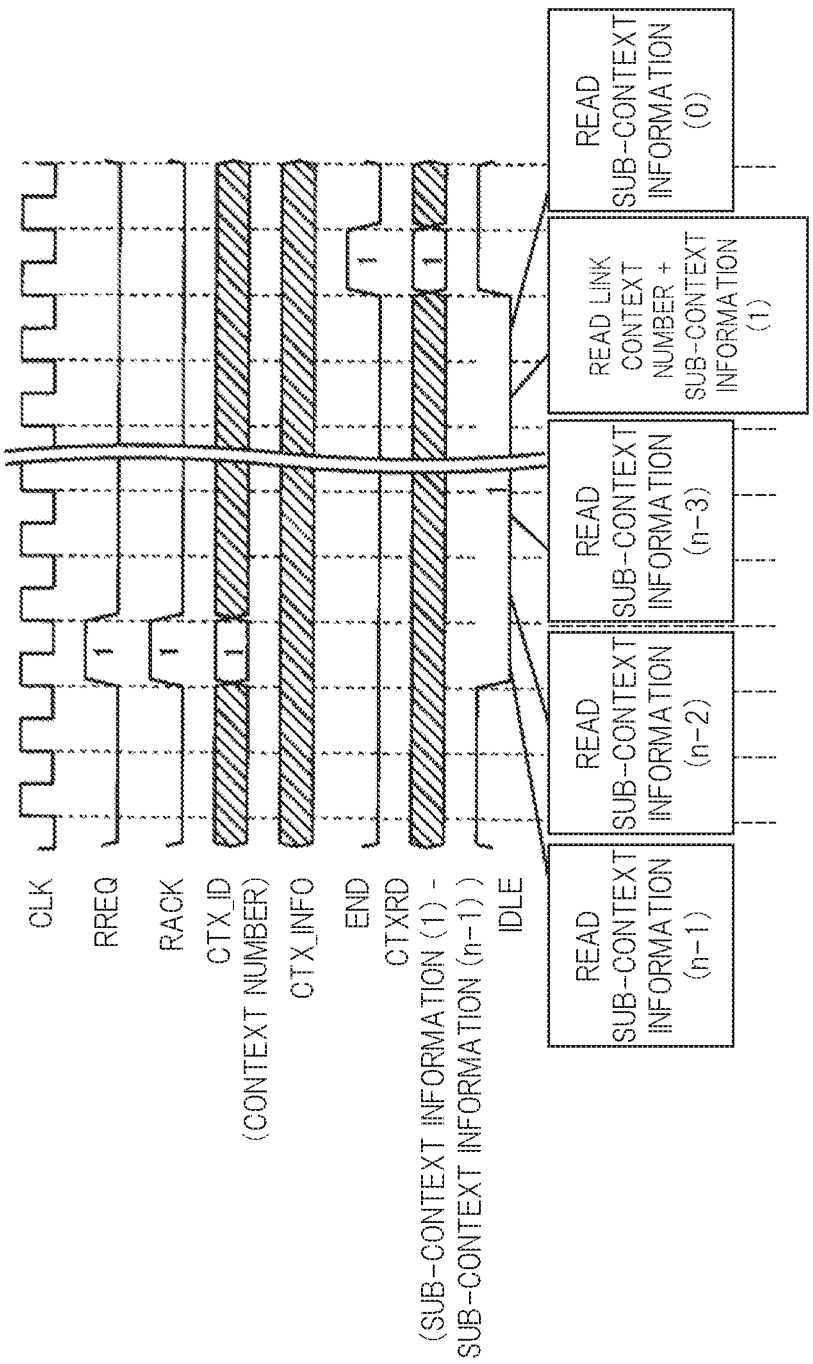
FIG. 10 is another example of a timing chart at the context reversion according to the second embodiment.

FIG. 9 is a diagram showing another example of the flow of data at the time of returning to the context according to the second embodiment. FIG. 10 is another example of a timing chart at the time of context return according to the second embodiment. FIGS. 9 and 10 show an example in which the context number in the buffer (0) and the input context number CTX_ID do not match.

Referring to FIGS. 9 and 10, the CPU 130 outputs a context-return-request (RREQ) through the bus BS 1. Access control circuit 140 receives the context-return-request (RREQ).

The access control circuit 140 outputs a context return acceptance (RACK) through the bus BS 1. The CPU 130 receives the context return acceptance (RACK).

The CPU 130 outputs the context number CTX_ID, here "1", via the bus BS 1. The access control circuit 140 receives the context number CTX_ID.

When the context number in the buffer (0) and the inputted context number CTX_ID do not coincide with each other, the access control circuit 140 specifies a block starting from an address corresponding to the context number CTX_ID in the RAM 160. Access control circuit 140 causes the RAM 160 to output the link context numbers and the sub-context information (1) to sub-context information (n−1) held in the first to (n−1)-th regions of the specified block to the buffers (1) to (n−1) of buffer group 150 in sequence.

In the first cycle, the sub-context information (n−1) held in the (n−1)-th area of the block starting from the address corresponding to the context number CTX_ID in the RAM 160 is sent to the buffer (n−1). In the i-th (1<i<n−1) cycle, the sub-context information (i) held in the (n−i)-th area of the block starting from the address corresponding to the context number CTX_ID in the RAM 160 is sent to the buffer (i). Finally, the link text number and the sub-context data (i) held in the first area of the blocks starting from the addresses corresponding to the context numbers CTX_ID in the RAM 160 are sent to the buffers (1).

Thereafter, the access control circuit 140 causes the access control circuit 140 to output the sub-context information (0) held in the 0-th area of the block starting from the address corresponding to the context number CTX_ID in the RAM 160 to the CPU 130 via the bus BS 3.

At the same time, as indicated by CTX_RD in FIG. 8, the access control circuit 140 outputs the sub-context information (1) to the sub-context information (n−1) held in the buffers (1) to (n−1) to the CPU 130 in one cycle through the bus BS 2.

The access control circuit 140 outputs the context return end (END) through the bus BS 1 at the same time as the outputs of the sub-context information (0) to the sub-context information (n−1). The CPU 130 receives a context-return-end (END).

In the prefetch after the context return, the access control circuit 140 transfers the context information and the data including the link context number stored in the RAM 160 to the buffer group 150 through the internal bus BS 4 in a plurality of cycles based on the link context number stored in the buffer group 150.

Figure 11:
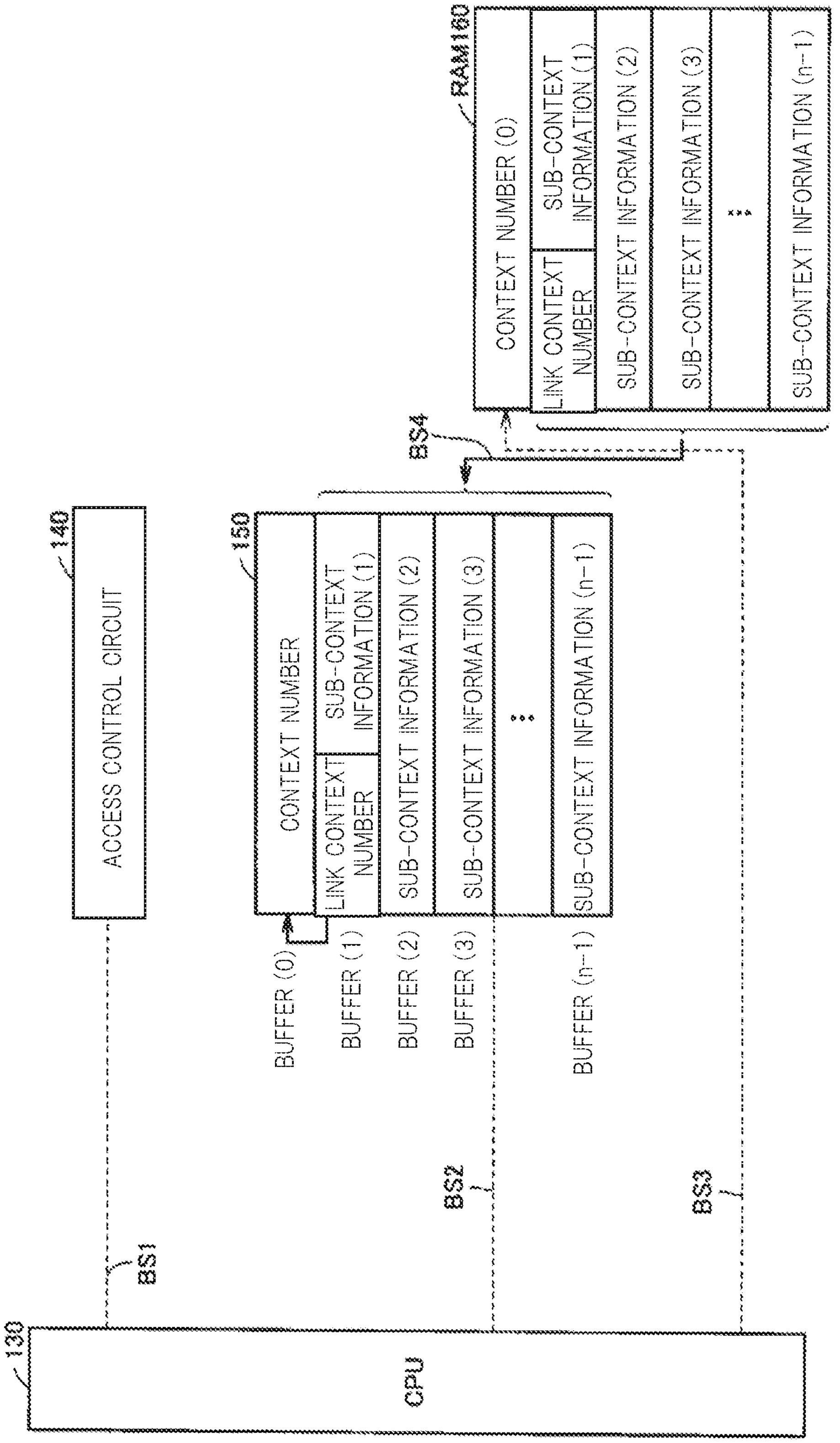
FIG. 11 is a diagram for explaining buffer control at the time of prefetching according to the second embodiment.

FIG. 11 is a diagram for explaining buffer control at the time of prefetch according to the second embodiment.

A prefetch is performed after the context return ends. The access control circuit 140 updates the context number in the buffer (0) by the link context number in the buffer (1). The access control circuit 140 transfers the link context number, the sub-context information (1) to the sub-context information (n−1) from the block starting from the address corresponding to the updated context number in the RAM 160 to the buffers (1) to (n−1) through the internal bus BS 4 in a plurality of cycles.

When the context number in the buffer (0) and the link context in the buffer (1) are the same value, the access control circuit 140 updates the context number in the buffer (0) and the link context number in the buffer (1) with predetermined invalid values without performing a prefetch operation.

When the CPU 130 receives a context save request (SREQ) during the prefetch operation, the access control circuit 140 stops the prefetch operation, accepts the context save request SREQ, and performs a normal context save operation.

Figure 12:
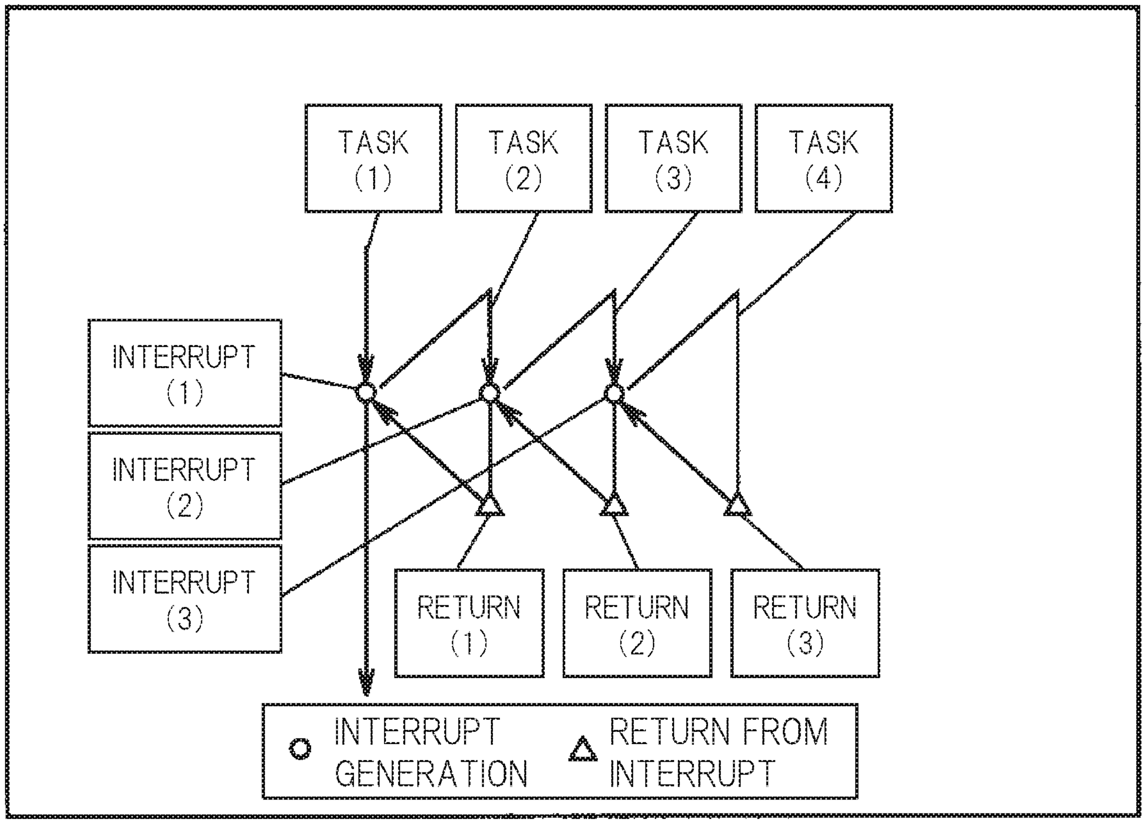
FIG. 12 is a diagram depicting an example of multiple interrupts.

FIG. 12 is a diagram showing an example of multiple interrupts. An interrupt (1) occurs during execution of task (1), task (1) stops execution halfway, and task (2) is executed. At this time, the context information of the task (1) is transferred from the CPU 130 to the memory module 110. The context number of the context information is "1".

An interrupt (2) is generated during execution of the task (2), the execution of the task (2) is stopped halfway, and the task (3) is executed. At this time, the context information of the task (2) is transferred from the CPU 130 to the memory module 110. The context number of the context information is "2".

An interrupt (3) is generated during execution of the task (3), the execution of the task (3) is stopped halfway, and the task (4) is executed. At this time, the context information of the task (3) is transferred from the CPU 130 to the memory module 110. The context number of the context information is "3".

After task (4) is completed, return (1) is performed, and execution of task (3) is resumed. At this time, the context information of the task (3) is transferred from the memory module 110 to the CPU 130.

After task (3) is completed, return (2) is performed, and execution of task (2) is resumed. At this time, the context information of the task (2) is transferred from the memory module 110 to the CPU 130.

After task (2) is completed, return (3) is performed, and execution of task (1) is resumed. At this time, the context information of the task (1) is transferred from the memory module 110 to the CPU 130.

Figure 13:
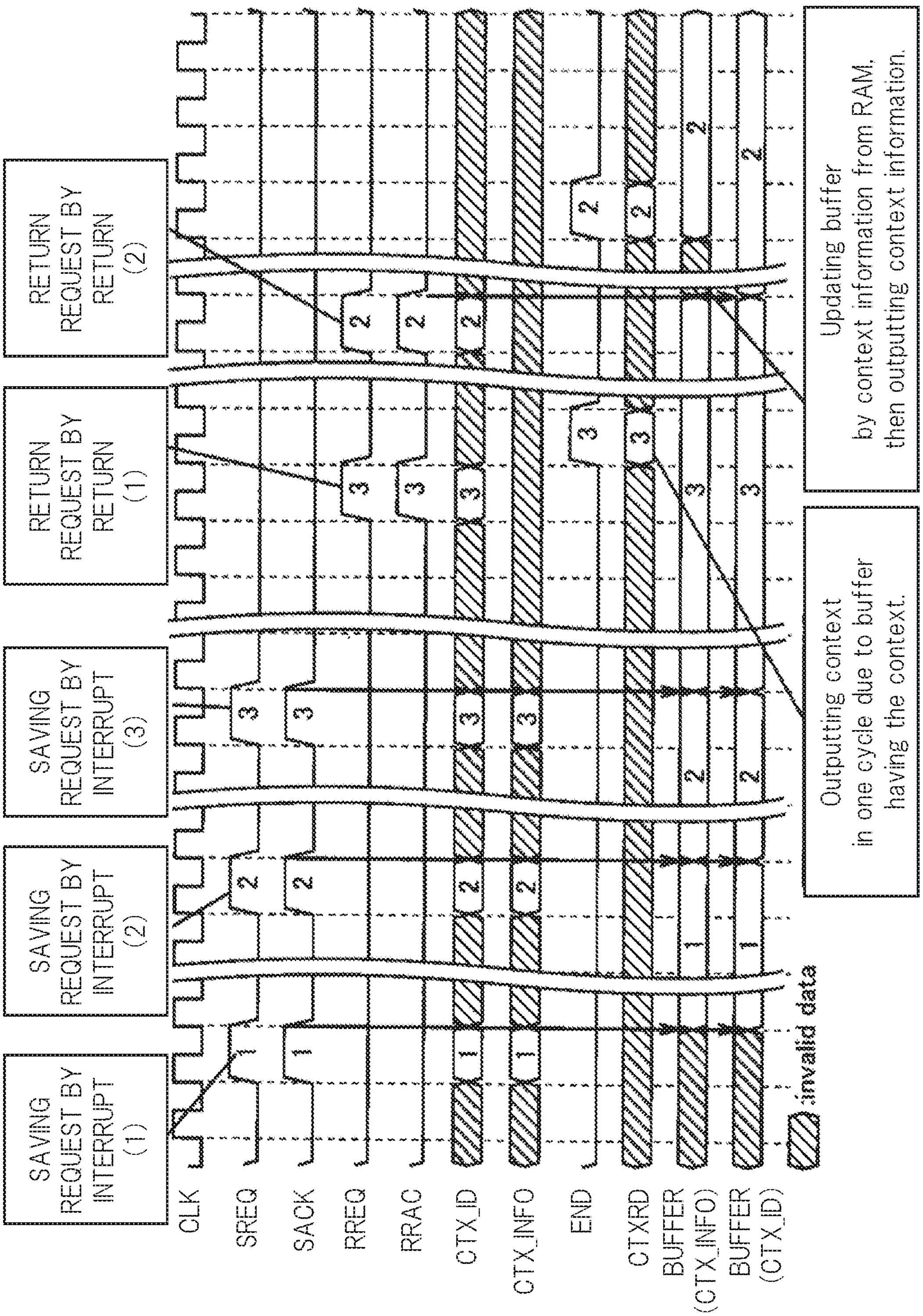
FIG. 13 is a diagram illustrating an operation timing when multiple interrupts are generated in the absence of the prefetch function according to the second embodiment.

FIG. 13 is a diagram showing an operation timing when the multiple interrupt of FIG. 12 occurs in the absence of the prefetch function of the second embodiment.

When the interrupt (1) occurs, the CPU 130 outputs a context-saving-request (SREQ) via the bus BS 1. The access control circuit 140 outputs a context-saving acceptance (SACK) through the bus BS 1. The CPU 130 outputs the context number CTX_ID (="1") via the bus BS1. The access control circuit 140 updates the context number in the buffer (0) with the input context number CTX_ID (="1"). The CPU 130 outputs the sub-context information (1) to sub-context information (n−1) of the task (1) to the buffer (1) to the buffer (n−1) in one cycle through the bus BS 2, and outputs the sub-context information (0) of the task (1) to the RAM 160 through the bus BS 3. The access control circuit 140 causes the RAM 160 to write the sub-context information (0) of the task (1) to the blocks starting from the address corresponding to the context number CTX_ID (="1"). Thereafter, the access control circuit 140 causes the RAM 160 to output the sub-context information (1) to the sub-context information (n−1) stored in the buffers (1) to (n−1) to the blocks starting from the address corresponding to the context number CTX_ID (="1") in a plurality of cycles through the internal bus BS 4.

Next, when the interrupt (2) occurs, as in the case wherein the interrupt (1) occurs, the context number CTX_ID (="2") is stored in the buffer (0) of the buffer group 150, and the sub-context information (1) to the context information (n−1) of the task (2) are stored in the buffers (1) to (n−1) of the buffer group 150. In addition, the sub-context information (0) to sub-context information (n−1) of the task (2) are stored in blocks starting from addresses corresponding to the context number CTX_ID (="2") in the RAM 160.

Next, when the interrupt (3) occurs, as in the case wherein the interrupt (1) occurs, the context number CTX_ID (="3") is stored in the buffer (0) of the buffer group 150, and the sub-context information (1) to sub-context information (n−1) of the task (3) are stored in the buffers (1) to (n−1) of the buffer group 150. In addition, the sub-context information (0) to sub-context information (n−1) of the task (3) are stored in blocks starting from addresses corresponding to the context number CTX_ID (="3") in the RAM 160.

Next, when the return (1) occurs, the CPU 130 outputs a context-return-request (RREQ) via the bus BS 1. The access control circuit 140 outputs a context return acceptance (RACK) through the bus BS 1. The CPU 130 outputs the context number CTX_ID (="3") via the bus BS 1. The access control circuit 140 causes the RAM 160 to output the sub-context information (0) of the task (3) held in the block whose starting point is the address corresponding to the context number CTX_ID in the RAM 160 to the CPU 130 through the bus 3. At the same time, the access control circuit 140 outputs the sub-context information (1) to the sub-context information (n−1) of the tasks (3) held in the buffers (1) to (n−1) to the CPU 130 in one cycle through the bus BS 2. At the same time, the access control circuit 140 outputs the context return end (END) through the bus BS 1. Since the sub-context information (1) to sub-context information (n−1) of the task (3) to be returned are held in the buffer group 150, all the sub-context information (0) to sub-context information (n−1) of the task (3) are transferred from the memory module to the CPU130 in one cycle.

Next, when the return (2) occurs, the CPU 130 outputs a context-return-request (RREQ) via the bus BS 1. The access control circuit 140 outputs a context return acceptance (RACK) through the bus BS 1. The CPU 130 outputs the context number CTX_ID (="2") via the bus BS 1. The access control circuit 140 causes the RAM 160 to sequentially output the sub-context information (1) to the sub-context information (n−1) held in the blocks starting from the address corresponding to the context number CTX_ID to the buffers (1) to (n−1) of the buffer group 150 in a plurality of cycles. Thereafter, the access control circuit 140 causes the RAM 160 to output the context information (0) held in the area starting from the address corresponding to the context number CTX_ID to the CPU 130 in one cycle through the bus BS 3. At the same time, the access control circuit 140 causes the buffer group 150 to output the sub-context information (1) to the sub-context information (n−1) of the tasks (2) held in the buffers (1) to (n−1) to the CPU 130 through the bus BS 2 in one cycle. At the same time, the access control circuit 140 outputs the context return end (END) through the bus BS 1.

Figure 14:
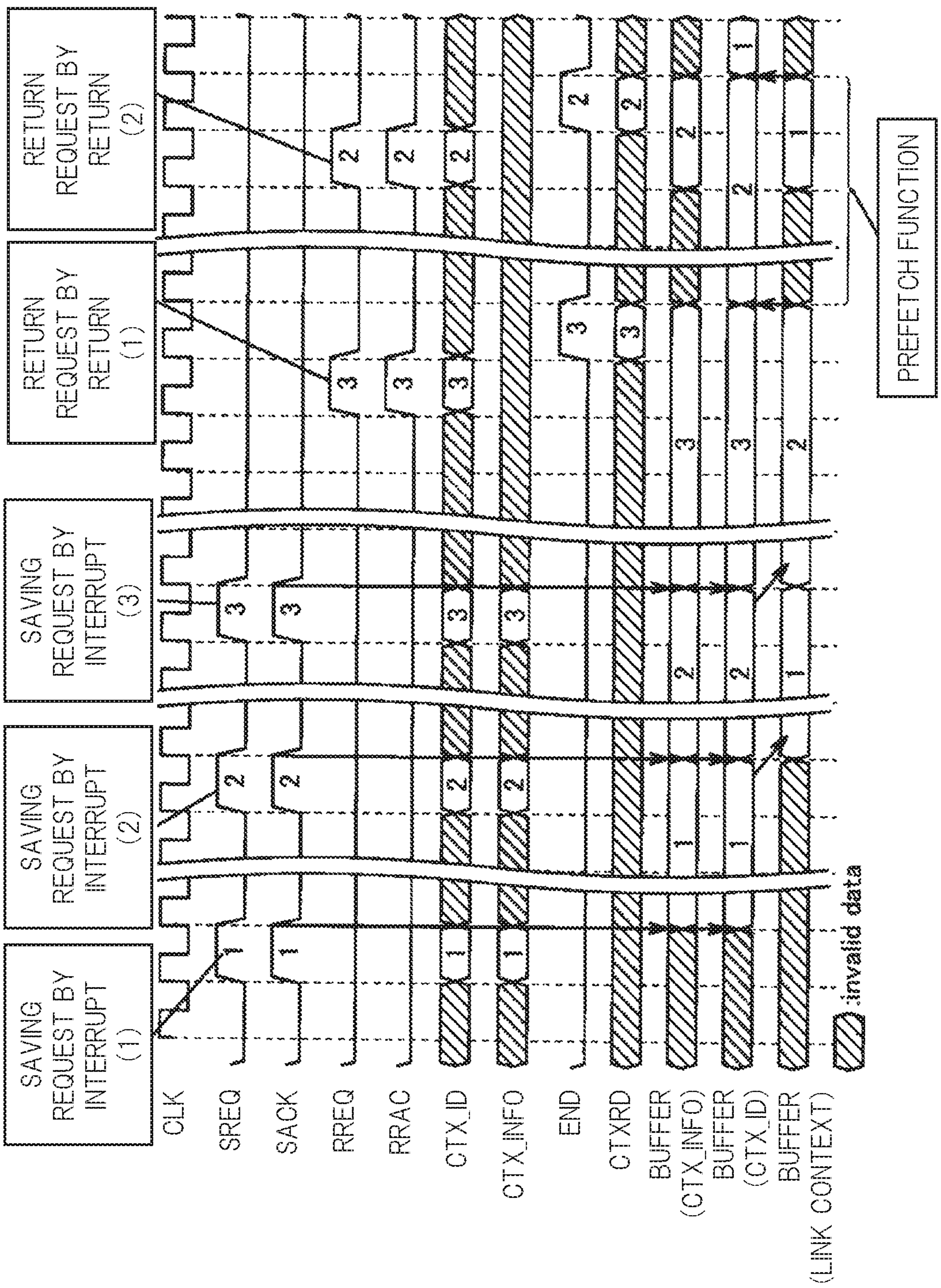
FIG. 14 is a diagram illustrating an operation timing when a multiple interrupt of FIG. 12 occurs and when there is a prefetch function according to the second embodiment.

FIG. 14 is a diagram showing an operation timing when the multiple interrupt of FIG. 12 occurs in the case where the prefetch function of the second embodiment is provided.

Differences from the operation of FIG. 13 will be described below. Since the context number held in the buffer (0) is an invalid value when the interrupt (1) occurs, the access control circuit 140 sets the link context number of the buffer (1) to an invalid value.

When the interrupt (2) occurs, since the context number held in the buffer (0) is "1", the access control circuit 140 updates the link context number in the buffer (1) to "1".

When the interrupt (3) occurs, since the context number held in the buffer (0) is "2", the access control circuit 140 updates the link context number in the buffer (1) to "2".

When the return (1) occurs, since the sub-context information and the link text number are not transferred from the RAM 160 to the buffer group 150, the link context number in the buffer (1) is maintained at "2".

After completion of the return (1), a prefetch is performed. Since the link context number stored in the buffer (1) is "2" after the completion of the return (1), the access control circuit 140 updates the context number of the buffer (0) to "2". The access control circuit 140 outputs the link context number (=1) of the task (2) and the sub context information (1) to the sub context information (n−1) of the task (2) held in the block starting from the address corresponding to the context number (="2") in the RAM 160 to the buffers (1) to (n−1) of the buffer group 150 through the internal bus BS 4 in a plurality of cycles.

Next, when the return (2) occurs, the CPU 130 outputs a context-return-request (RREQ) via the bus BS 1. The access control circuit 140 outputs a context return acceptance (RACK) through the bus BS 1. The CPU 130 outputs the context number CTX_ID (="2") via the bus BS 1. The access control circuit 140 causes the RAM 140 to output the sub-context information (0) of the task (2) held in the block starting from the address corresponding to the context number CTX_ID to the CPU 130 in one cycle through the bus BS3. At the same time, the access control circuit 140 outputs the sub-context information (1) to the sub-context information (n−1) of the task (2) held in the buffers (1) to (n−1) to the CPU 130 through the bus BS 2 in one cycle. At the same time, the access control circuit 140 outputs the context return end (END) through the bus BS 1. Since the sub-context information (1) to sub-context information (n−1) of the task (2) are held in the buffer group 150, all the sub-context information (0) to sub-context information (n−1) of the task (2) are transferred from the memory modules to the CPU 130 in one cycle.

As described above, according to the present embodiment, when the context information is saved by the interrupt, the link context number for identifying the context information transferred from the CPU before the interrupt is written in the buffer group. By prefetching the context information into the buffer group using this link context number, the context information can be returned in a short time at the time of return from the interrupt.

In the present embodiment, in order to reduce the time for saving and restoring the context information, the sub-context information (0) is directly transferred from the CPU to the RAM, but the present invention is not limited thereto. The sub-context information (0) may also be transferred from the CPU to the RAM via the buffer group.

In the present embodiment, in order to associate the context number with the context information, context information (sub-context information (0) to (n−1)) of context number=k and the link context number are stored in a block starting from the address ADD(k) in the RAM, but the present invention is not limited thereto. The RAM may store a context number, context information corresponding to the context number, and a link context number.

Third Embodiment

Figure 15:
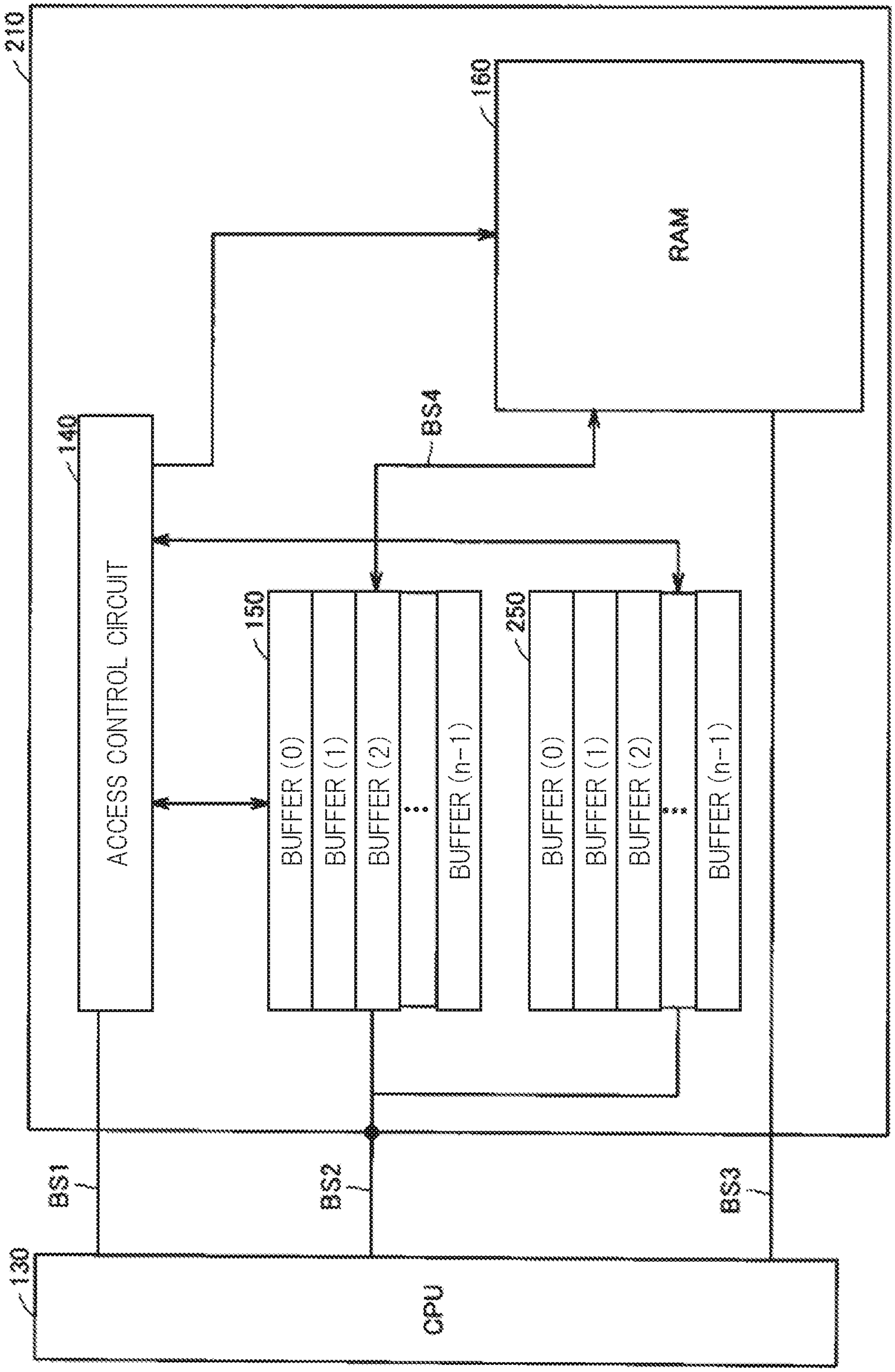
FIG. 15 is a diagram illustrating a configuration of a memory module 210 according to a third embodiment.

FIG. 15 is a diagram illustrating the configuration of the memory module 210 of the third embodiment.

The memory module 210 of the third embodiment is different from the memory module 110 of the second embodiment.

The memory module 210 includes an expansion buffer group 250. Similar to the buffer group 150, the extension buffer group 250 is also connected to the CPU 130 via the bus BS 2.

FIG. 16 is a diagram showing information stored in the extended buffer group 250 according to the third embodiment. The extended buffer group 250 includes buffers (0) to (n−1). The buffer (i) has a storage area of M bits.

A context number is held in the buffer (0) of the extension buffer group 250. The buffers (1) to (n−1) hold the sub-context information (1) to (n−1).

In the second embodiment, at the return (1) shown in FIG. 12, the sub-context information (1) to the sub-context information (n−1) must be read from the RAM 160 on returning to the task (1) that is stopped by the earliest interrupt without returning to the task (3). As a result, it takes time to return to task (1).

Figure 17:
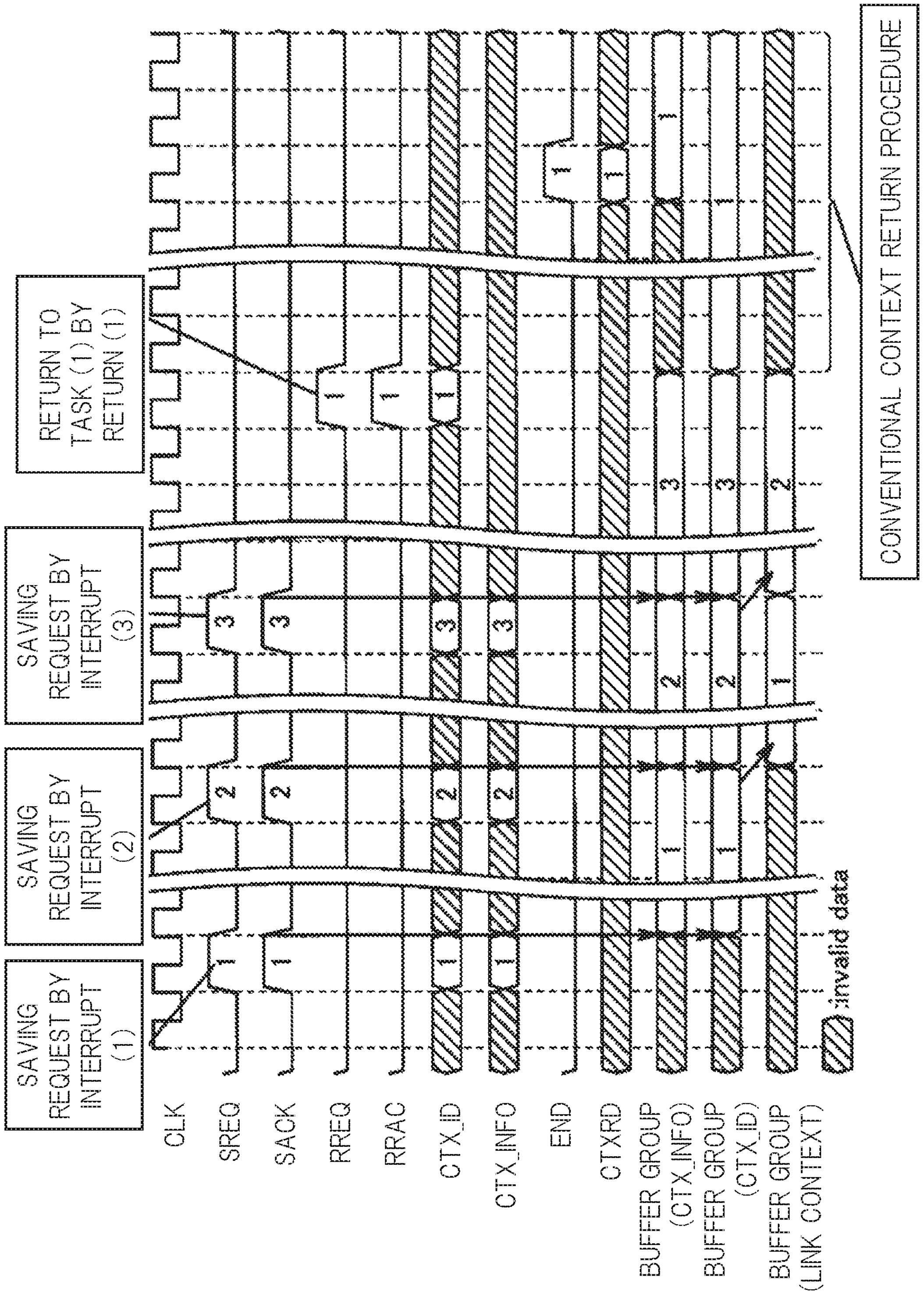
FIG. 17 is a diagram showing operation timings at the time of context saving and restoration according to the second embodiment.

First, for comparison, the operation of the memory module 110 of the second embodiment will be described. FIG. 17 is a timing chart for context saving and restoration according to the second embodiment.

Similar to FIG. 14, an interrupt (1), an interrupt (2), and an interrupt (3) are generated, a context number (="3") is held in the buffer (0) of the buffer group 150, a link text number (="2") is held in the buffer (1), and sub-context information (1) to sub-context information (n−1) of the task (3) are held in the buffers (1) to (n−1).

Next, when the return (1) for returning to the task (1) occurs, the CPU 130 outputs a context-return-request (RREQ) via the bus BS 1. The access control circuit 140 outputs a context return acceptance (RACK) through the bus BS 1. The CPU 130 outputs the context number CTX_ID (="1") via the bus BS 1. The access control circuit 140 causes the RAM 160 to output the link context number and the sub-context information (1) to the sub-context information (n−1) of the task (1) held in the blocks starting from the address corresponding to the context number CTX_ID (="1") in the RAM 160 to the buffers (1) to (n−1) of the buffer group 150 in a plurality of cycles through the internal bus BS 4. Thereafter, the access control circuit 140 causes the RAM 160 to output the sub-context information (0) held in the block starting from the address corresponding to the context number CTX_ID to the CPU 130 through the bus BS 3. At the same time, the access control circuit 140 causes the buffer group 150 to output the sub-context information (1) to the sub-context information (n−1) of the task (1) held in the buffers (1) to (n−1) to the CPU 130 through the bus BS 2 in one cycle. At the same time, the access control circuit 140 outputs the context return end (END) through the bus BS 1.

As described above, in the second embodiment, when returning to the task (1), the context information of the task (1) needs to be transferred from the RAM 160 to the buffer group 150.

In the present embodiment, when returning to the task (1) after an interruption occurs, the time required for restoration can be shortened by eliminating the need to read out the sub-context information (1) to the sub-context information (n−1) from the RAM 160. The saving of the context information of task (1) takes into account the high possibility of returning to the first task whose execution has been stopped by the earliest interrupt when multiple nested interrupts occur.

The context number stored in the buffer (0) of the extended buffer group 250 is a predetermined invalid value in the initial state.

The access control circuit 140 performs the following processing when the context number stored in the buffer (0) of the extension buffer group 250 is the predetermined invalid value, or matches the context number identifying the context information to be saved, upon receiving a request to save the context information by an interrupt.

Access control circuit 140 causes the CPU 130 to output the context information to the extended buffer group 250 in one cycle through bus BS 2 as well as the buffer group 150. The access control circuit 140 writes the context number identifying the context information not only to the buffer (0) of the buffer group 150 but also to the buffer (0) of the extended buffer group 250. The access control circuit 140 writes the link context number to the buffer (1) of the buffer group 150, but does not write the link context number to the extension buffer group 250.

<Context Return>

The access control circuit 140 controls the following transmission when the context number identifying the context information to be retuned matches the context number stored in the buffer (0) of the extended buffer group 250 upon receiving a request to restore the context information evacuated by the interrupt. That is, the access control circuit 140 transfers the context information (sub-context information (1) to (n−1)) stored in the extension buffer group 250 to the CPU 130 through the bus BS 2 in one cycle. The access control circuit 140 updates the context number of the buffer (0) of the extended buffer group 250 with a predetermined invalid value.

When the access control circuit 140 receives a request to restore the context information saved by the interrupt, the access control circuit 140 controls the following transfer when the context number identifying the context information to be restored does not match the context number stored in the buffer (0) of the extended buffer group 250 but matches the context number stored in the buffer (0) of the buffer group 150. That is, the access control circuit 140 transfers the context information (sub-context information (1) to (n−1)) stored in the buffer (0) of the buffer group 150 to the CPU 130 through the bus BS 2 in one cycle.

When the access control circuit 140 receives a request to restore the context information saved by the interrupt, if the context number identifying the context information to be restored does not coincide with the context number stored in the buffer (0) of the extended buffer group 250 and does not coincide with the context number stored in the buffer (0) of the buffer group 150, the access control circuit 140 executes the following. The access control circuit 140 performs a normal context return operation as in the second embodiment. That is, the access control circuit 140 transfers the data including the context information (sub-context information (1) to (n−1)) and the link context number stored in the RAM 160 to the buffer group 150 through the internal bus BS 4 in a plurality of cycles in association with the context number. Thereafter, the access control circuit 140 transfers the transferred context information (sub-context information (1) to (n−1)) of the buffers 150 to the CPU 130 in one cycle through the bus BS 2.

Regardless of the context number identifying the context information to be returned, the access control circuit 140 transfers the sub-context information (0) stored in the RAM 160 corresponding to the context number to the CPU 130 in one cycle through the bus BS 3.

Figure 18:
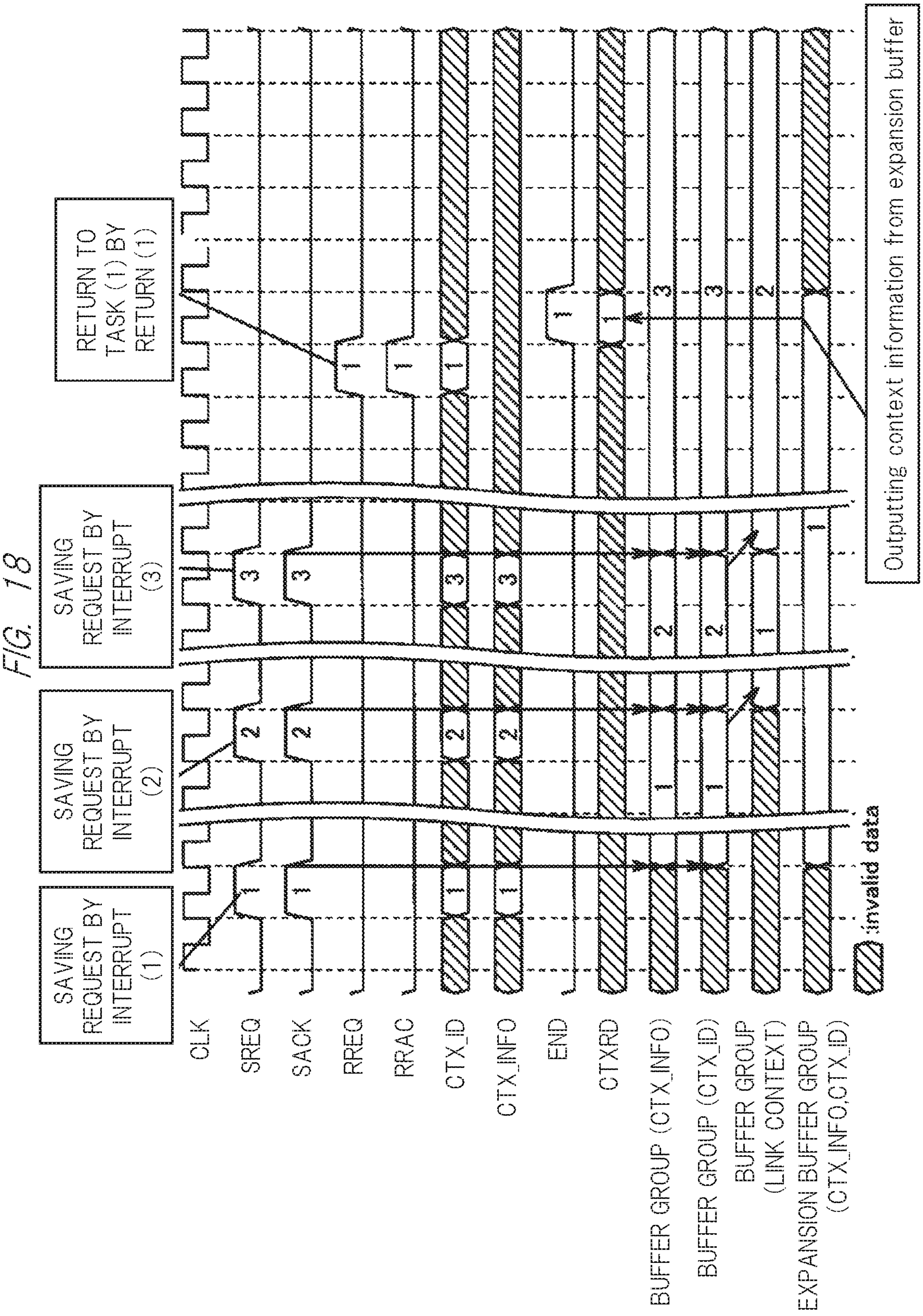
FIG. 18 is a diagram for explaining the timing of operation in the context evacuation and return according to the third embodiment.

FIG. 18 is a diagram for explaining operation timings at the time of context saving and restoration according to the third embodiment.

The operation shown in FIG. 18 differs from the operation shown in FIG. 17. When the interrupt (1) occurs, the context number (="1") is held in the buffer (0) of the buffer group 150, and the sub-context information (1) to the sub-context information (n−1) are held in the buffers (1) to (n−1) similarly to the embodiment of FIG. 17. The sub-context information (0) to the sub-context information (n−1) of the task (1) are held in blocks starting from addresses corresponding to the context number CTX_ID (="1") in the RAM 160.

When the first interrupt (1) occurs after the program is started, the access control circuit 140 writes the context number CTX_ID (=1) sent through the bus BS 1 not only to the buffer (0) of the buffer group 150, but also to the buffer (0) of the extension buffer group 250.

As in the second embodiment, the access control circuit 140 writes the link context number into the buffer (1) of the buffer group 150. The access control circuit 140 writes the sub-context information (1) to sub-context information (n−1) sent through the bus BS 2 not only to the buffers (1) to (n−1) of the buffer group 150, but also to the buffers (1) to (n−1) of the extended buffer group 250.

When the return (1) occurs, the CPU 130 outputs the context number CTX_ID (="1") via the bus BS 1. The access control circuit 140 causes the RAM 160 to output the sub-context information (0) of the task (1) held in the block starting from address corresponding to the context number CTX_ID to the CPU 130. At the same time, the access control circuit 140 outputs the sub-context information (1) to the sub-context information (n−1) of the tasks (1) held in the buffers (1) to (n−1) held in the extension buffer group 250 to the CPU 130 through the bus BS 2 in one cycle. Since the sub-context information (1) to the sub-context information (n−1) of the task (1) are held in the extended buffer group 250, all the sub-context information (0) to the sub-context information (n−1) of the task (1) are transferred from the memory module to the CPU 130 in one cycle.

<Prefetch>

When the link context number of the buffer (1) of the buffer group 150 matches the context number of the buffer (0) of the extended buffer group 250 in the prefetch after the return, the access control circuit 140 does not transfer the context information (sub-context information (1) to (n−1)) and the data including the link context number from the RAM 160 to the buffer group 150.

When the link context number of the buffer (1) of the buffer group 150 does not match the context number of the buffer (0) of the extension buffer group 250, the access control circuit 140 transfers data including the context information (sub-context information (1) to (n−1)) and the link context number stored in the RAM 160 to the buffer group 150 through the internal bus BS 4 in a plurality of cycles.

As described above, according to the present embodiment, when multiple interrupts as shown in FIG. 12 occur, the sub-context information (1) to (n−1) can be transferred from the expansion buffer group to the CPU, not from the RAM, in the case of returning to the task whose execution was stopped at the time of the earliest interruption in the first returning (1). This makes it possible to shorten the recovery time of the task.

Fourth Embodiment

In the third embodiment, upon returning to the task (1) by the return (1) shown in FIG. 12, the context information of the task (1) can be transferred from the extension buffer group 250 to the CPU 130.

However, upon returning to the task (2) by the return (1) shown in FIG. 12, the context information of the task (2) needs to be read from the RAM 160, and it takes a long time to return to the context information.

In the present embodiment, when the task (2) is restored by the restore (1) shown in FIG. 12, the time for the restore is reduced as compared with the second and third embodiments.

In the present embodiment, the buffer group 150 holds context numbers and context information of a plurality of tasks. By prefetching, a large storage area is allocated to a task having a high priority. Tasks that are more likely to return are assigned higher priorities.

Buffer group 150 is configured to store, for each of the plurality of interrupts, context data comprising context information, a context number identifying the context information, and a link context number identifying the context information transferred during the previous interrupt.

Figure 19:
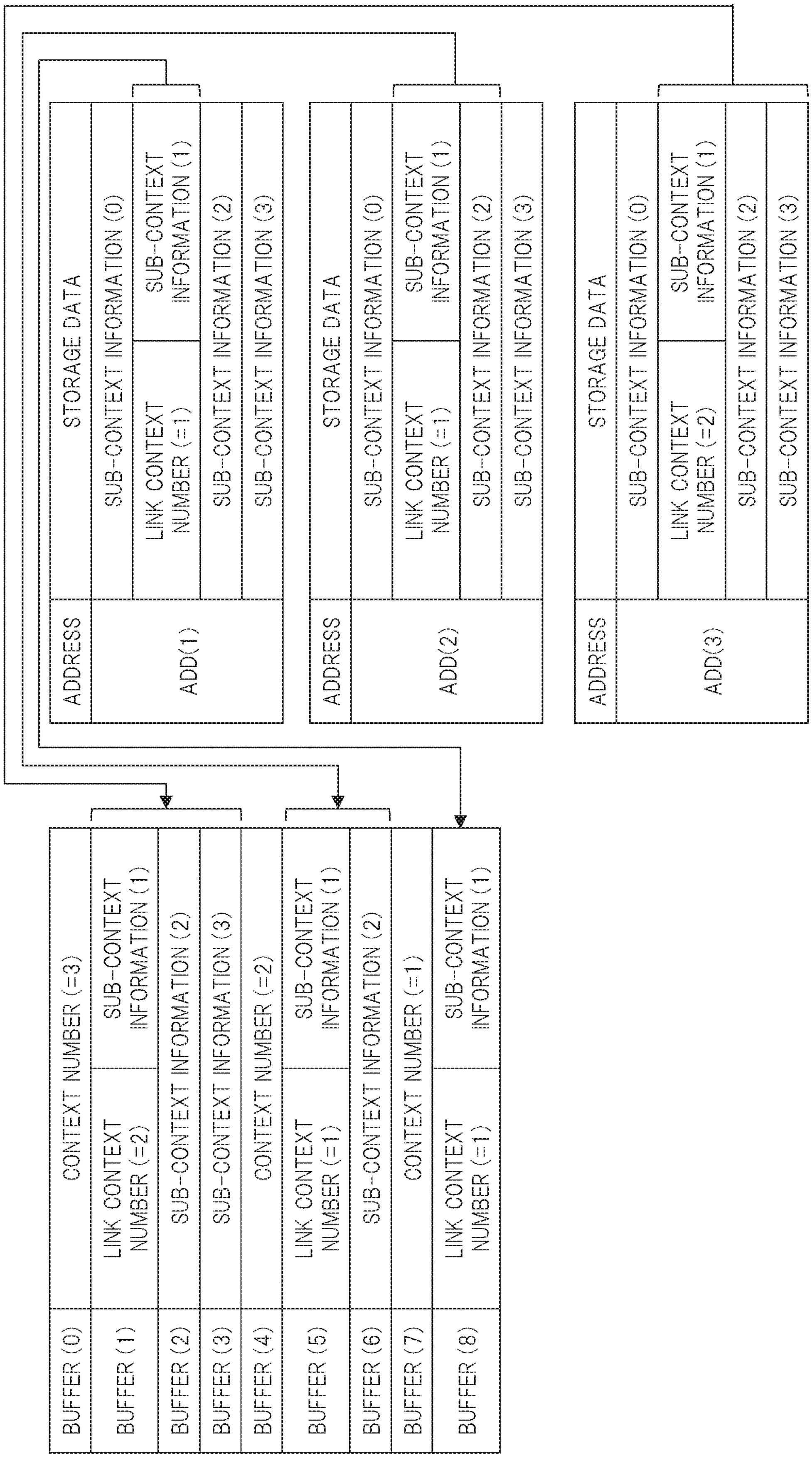
FIG. 19 is a diagram showing information stored in a RAM160 and a group of buffers 150 according to a fourth embodiment.

FIG. 19 is a diagram showing information stored in the RAM 160 and buffer group 150 according to the fourth embodiment.

The RAM 160 stores information of tasks (1) to (3). In the RAM 160, the sub-context information (0) to (3) and the link context information number of the task (i) are stored in blocks indicated by addresses corresponding to the context number (=i) of the task (i). i=1 to 4.

In the prefetching, the access control circuit 140 transfers data including a part or all of the context information and the link context number for each of the tasks stored in the RAM 160 to the buffer group 150 through the internal bus BS 4 so that the data amount of the context information of the task having the highest priority of the buffer group 150 is larger than the data amount of the context information of the other tasks.

For example, there are task (3), task (2), and task (1) in descending order of priority. By prefetching, the data of the task (3) is stored in four buffers, the data of the task (2) is stored in three buffers, and the data of the task (1) is stored in two buffers.

The buffer (0) holds the context number (="3"). The link context number (="2") of the task (3) and the sub-context information (1) of the task (3) are transferred from the RAM 160 to the buffer (1). The sub-context information (2) of the task (3) is transferred from the RAM 160 to the buffer (2). The sub-context information (3) of the task (3) is transferred from the RAM 160 to the buffer (3).

The buffer (4) holds the context number (="2"). The link context number (="1") of the task (2) and the sub-context information (1) of the task (2) are transferred from the RAM 160 to the buffer (5). The sub-context information (2) of the task (2) is transferred from the RAM 160 to the buffer (6).

The buffer (7) holds the context number (="1"), and the link context number (="1") of the task (1) and the sub-context information (1) of the task (1) are transferred from the RAM 160 to the buffer (8).

Figure 20:
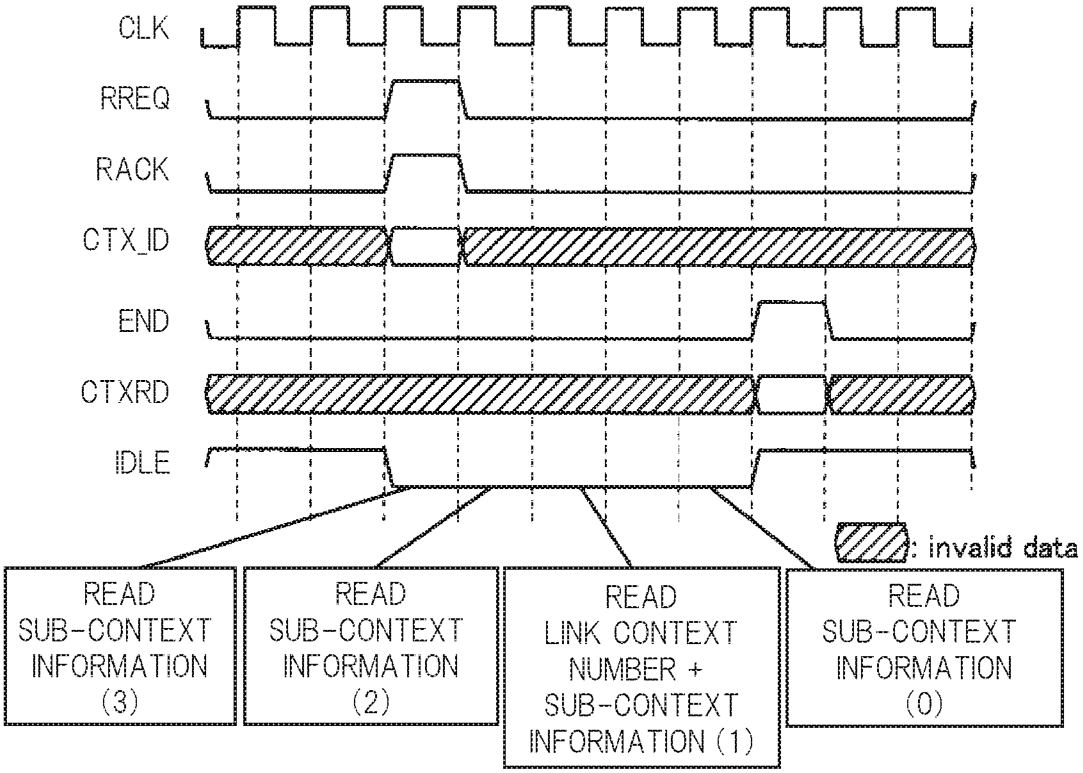
FIG. 20 is a diagram illustrating a first example of an operation timing when returning to the context according to the fourth embodiment.

FIG. 20 is a diagram showing a first example of the operation timing at the time of returning to the context according to the fourth embodiment.

The context number CTX_ID sent from the CPU 130 is "4". Since the context information of the context number (="4") is not held in the buffer group 150, the sub-context information (3), (2), (1) and the link context number of the context number (4) are sequentially outputted from the RAM 160 to the buffer group 150 via the internal bus BS 4. Context information (0) is output from the RAM 160 to the CPU130 in one cycle through the bus BS 3, and sub-context information (3), (2), and (1) of the group of buffers 150 is output to the CPU 130 in one cycle through the bus BS 2.

Figure 21:
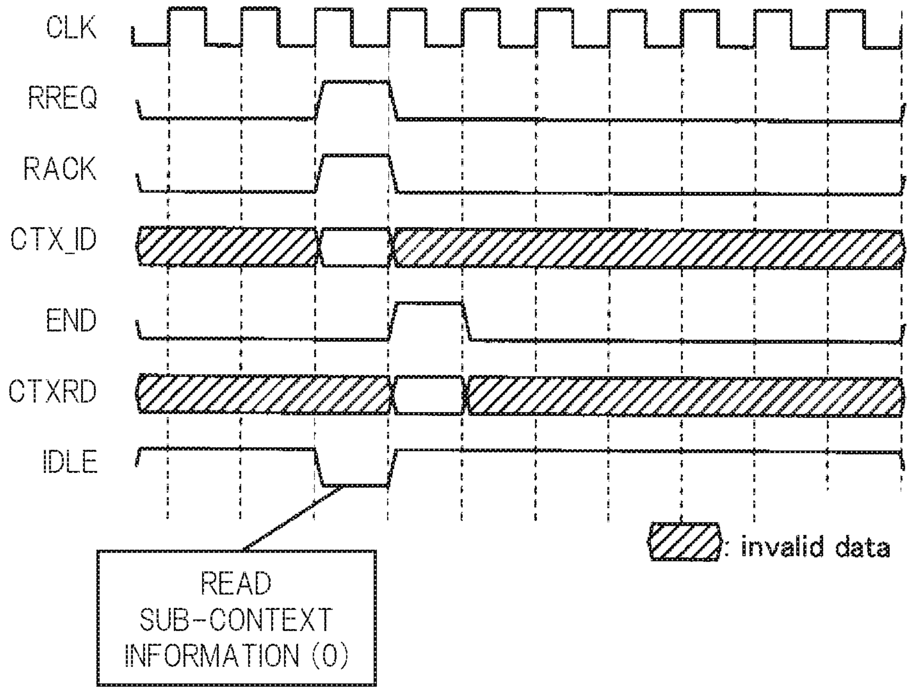
FIG. 21 is a diagram illustrating a second example of an operation timing when returning to the context according to the fourth embodiment.

FIG. 21 is a diagram showing a second example of the operation timing at the time of returning to the context according to the fourth embodiment.

The context number CTX_ID sent from the CPU 130 is "3". Since the link context number and the sub-context information (1), (2), and (3) of the context number (="3") are held in the buffer group 150, the sub-context information (0) is outputted from the RAM 160 to the CPU 130 in one cycle through the bus BS 3. Further, the sub-context information (3), (2), and (1) of the buffer group 150 are outputted to the CPU 130 in one cycle through the bus BS 2.

Figure 22:
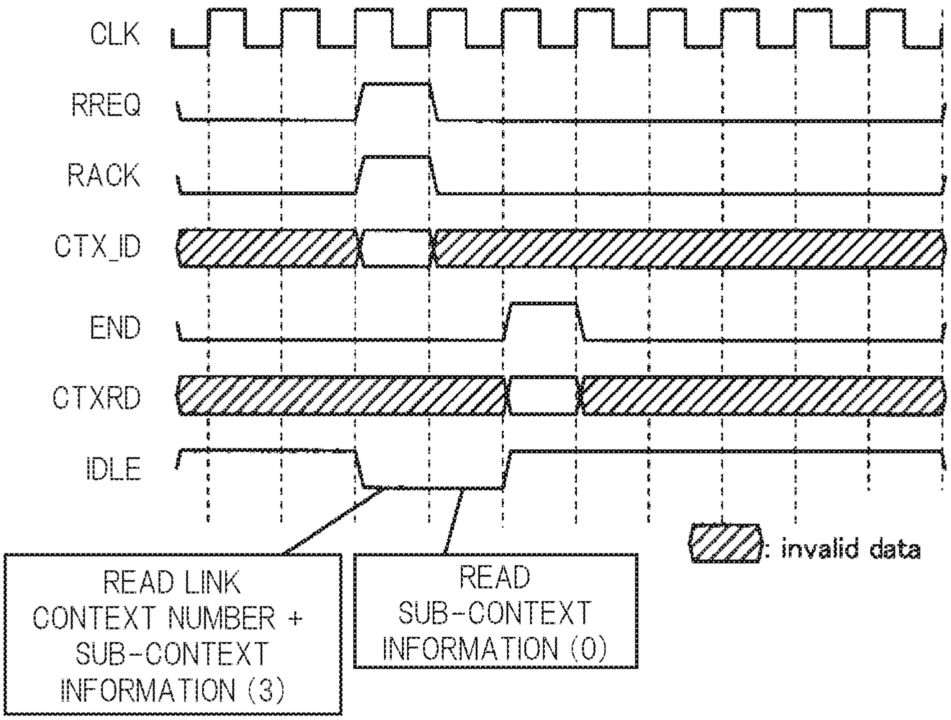
FIG. 22 is a diagram illustrating a third example of an operation timing when returning to the context according to the fourth embodiment.

FIG. 22 is a diagram showing a third example of the operation timing at the time of returning to the context according to the fourth embodiment.

The context number CTX_ID sent from the CPU 130 is "2". The buffer group 150 holds the link context number and the sub-context information (1) and (2) of the context number (="2"). The RAM 160 outputs the sub-context information (3) of the context number (="3") to the buffer group 150 in one cycle through the internal bus BS 4. Sub-context information (0) is output from the RAM 160 to the CPU 130 in one cycle through the bus BS 3, and sub-context information (3), (2), and (1) of the buffer group 150 is output to the CPU 130 in one cycle through the bus BS 2.

Figure 23:
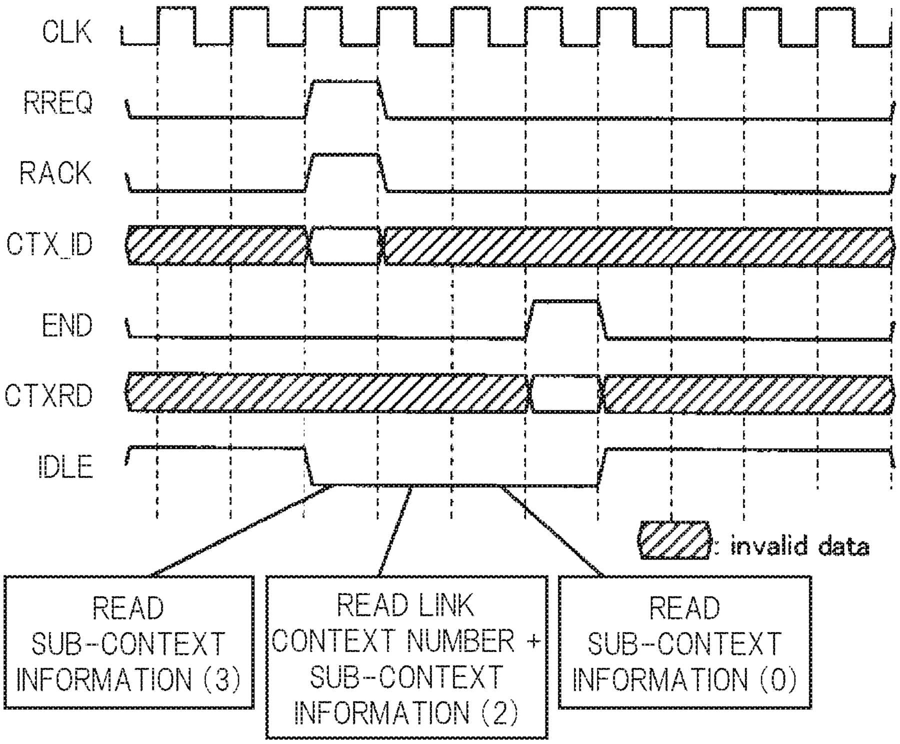
FIG. 23 is a diagram illustrating a fourth example of an operation timing when returning to the context according to the fourth embodiment.

FIG. 23 is a diagram showing a fourth example of the operation timing at the time of returning to the context according to the fourth embodiment.

The context number CTX_ID sent from the CPU 130 is "1". The buffer group 150 holds the link context number and the sub-context information (1) of the context number (="1"). The RAM 160 outputs the sub-context information (3) and the sub-context information (2) of the context number (="3") to the buffer group 150 in two cycles through the internal bus BS 4. Sub-context information (0) is output from the RAM 160 to the CPU 130 in one cycle through the bus BS 3, and sub-context information (3), (2), and (1) of the buffer group 150 is output to the CPU 130 in one cycle through the bus BS 2.

As described above, according to the present embodiment, it is possible to increase the possibility that the recovery time can be shortened by transferring more sub-context information to the buffer group as the task has a higher possibility of recovering by prefetching.

Fifth Embodiment

The buffer group 150 are configured to store, for each of the plurality of interrupts, context data comprising context information, a context number identifying the context information, and a link context number identifying the context information transferred from the CPU130 at the time of the previous interrupt.

Buffer group 150 includes buffer (1-0), buffer (1-1), buffer (1-2), buffer (1-3), buffer (2-0), buffer (2-1), buffer (2-2), buffer (3-0), and buffer (3-1).

The buffers (1-0) to (1-3) store the context data of the first task, the buffers (2-0) to (2-2) store the context data of the second task, and the buffers (3-0) to (3-1) store the context data of the third task.

<Context Evacuation>

When the access control circuit 140 receives a request to evacuate task context information by an interrupt, the access control circuit 140 identifies an area size for storing the latest context data consisting of context information and a context number identifying the context information transferred from the CPU 130 in one cycle, and of a link context number identifying a context information transferred from the CPU 130 prior to the interrupt. The access control circuit 140 checks whether or not the buffer group 150 has the area size. When there is no area to be stored, the access control circuit 140 deletes, from the buffer group 150, data including any of the context information and the link context number stored in the buffer group 150, in order to create the area to be stored. Thereafter, the access control circuit 140 writes the latest context data into the buffer group 150. The access control circuit 140 transfers the data including the context information and the link context number, which constitute the latest context data written in the buffer group 150, to the RAM 160 through the internal bus BS 4 in one or more cycles.

In the following explanation, the context information of one task is divided into sub-context information (0) directly transferred from the CPU 130 to the RAM 160, and sub-context information (1) to (3) transferred from the CPU 130 to the buffer group 150.

Figure 24:
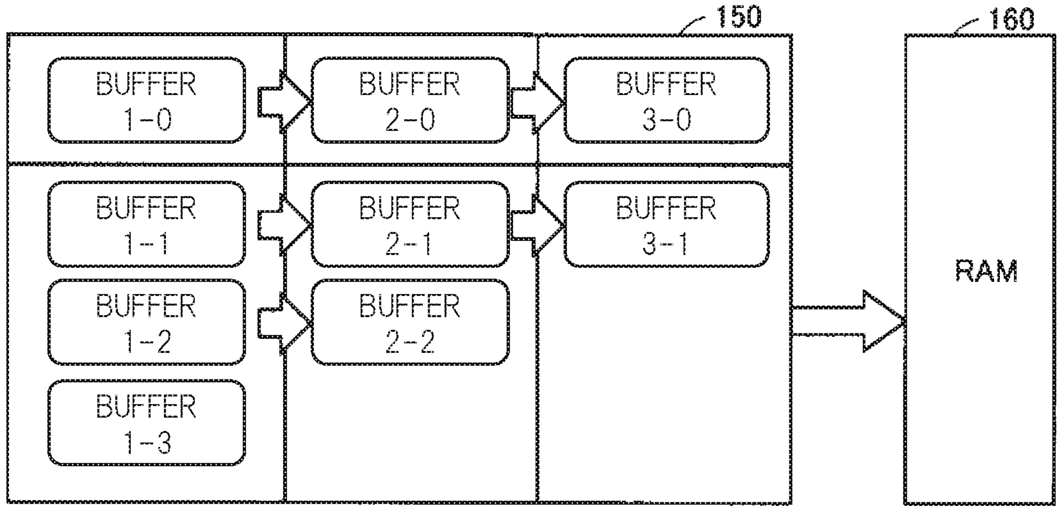
FIG. 24 is a diagram for explaining buffer control during context evacuation according to a fifth embodiment.

FIG. 24 is a diagram for explaining buffer control at the time of context saving in the fifth embodiment.

When the context numbers held in the buffers (1-0), (2-0), and (3-0) match the context numbers identifying the context information to be saved, the access control circuit 140 changes the context numbers held in the buffers (1-0), (2-0) and (3-0) to predetermined invalid values.

The access control circuit 140 shifts the data of the buffer group 150 to the right in the following manner.

The access control circuit 140 discards the data of the buffers (3-0) and (3-1), transfers the data of the buffers (2-0) and (2-1) to the buffers (3-0) and (3-1), and discards the data of the buffer (2-2). The access control circuit 140 transfers the data of the buffers (1-0), (1-1), and (1-2) to the buffers (2-0), (2-1), and (2-2), and discards the data of the buffer (1-3). The access control circuit 140 transfers the data from the CPU 130 to the buffers (1-0), (1-1), (1-2), and (1-3). The access control circuit 140 transfers the data of the buffers (1-1), (1-2), and (1-3) to the RAM 160 in one or a plurality of cycles. When the sum of the sizes of the buffers (1-1), (1-2) and (1-3) is equal to or smaller than (M+$\alpha$) bits which are the widths of the internal buses BS 4, the data of the buffers (1-1), (1-2) and (1-3) are transferred to the RAM 160 in one cycle. When the sum of the sizes of the buffers (1-1), (1-2) and (1-3) exceeds (M+$\alpha$) bits which are the widths of the internal buses BS 4, the data of the buffers (1-1), (1-2) and (1-3) are transferred to the RAM160 in a plurality of cycles.

FIG. 25A is a diagram showing data stored in the buffer group 150 by context saving when the interrupt (1) shown in FIG. 12 occurs.

When the interrupt (1) occurs, the access control circuit 140 writes the context number (=1) in the buffer (1-0). The access control circuit 140 writes the link context number of the task (1) and the sub-context information (1) to (3) in the buffers (1-1), (1-2), and (1-3). The access control circuit 140 transfers the data of the buffers (1-0), (1-1), (1-2), and (1-3) to the RAM 160 through the internal bus BS in one or a plurality of cycles.

FIG. 25B is a diagram showing data stored in the buffer at the time of context saving when the interrupt (2) is generated.

When the interrupt (2) occurs, the access control circuit 140 transfers the context number (=1), the link context number, and the sub-context information (1) and (2) of the task (1) held in the buffers (1-0), (1-1), and (1-2) to the buffers (2-0), (2-1), and (2-2) (shift to the right). The sub-context information (3) of the task (1) held in the buffer (1-3) is discarded. The access control circuit 140 writes the context number (=2) in the buffer (1-0). The access control circuit 140 writes the link context number and the sub-context information (1) to (3) of the task (2) in the buffers (1-1), (1-2), and (1-3). The access control circuit 140 transfers the data of the buffers (1-0), (1-1), (1-2), and (1-3) to the RAM 160 through the internal bus BS 4 in one or a plurality of cycles.

FIG. 25C is a diagram showing data stored in the buffer at the time of context saving when the interrupt (3) occurs.

When the interrupt (3) occurs, the access control circuit 140 transfers the context number (=1), the link context number, and the sub-context information (1) of the task (1) held in the buffers (2-0) and (2-1) to the buffers (3-0) and (3-1) (shift rightward). The sub-context information (2) of the task (1) held in the buffer (2-2) is discarded.

The access control circuit 140 transfers the context number (=2), the link context number and the sub-context information (1), (2) of the task (2) held in the buffers (1-0), (1-1), and (1-2) to the buffers (2-0), (2-1), and (2-2) (shift to the right). The context information (3) of the task (2) held in the buffer (1-3) is discarded.

The access control circuit 140 writes the context number (=3) in the buffer (1-0). The access control circuit 140 writes the link context number and the sub-context information (1) to (3) of the task (3) in the buffers (1-1), (1-2), and (1-3). The access control circuit 140 transfers the data of the buffers (1-0), (1-1), (1-2), and (1-3) to the RAM 160 through the internal bus BS 4 in one or a plurality of cycles.

FIG. 25D is a diagram showing data stored in the buffer at the time of context saving when the interrupt (4) is generated.

When the interrupt (4) occurs, the access control circuit 140 deletes the context number (=1) of the task (1) held in the buffer (3-0), and transfers the link context number and the sub-context information (1) held in the buffer (3-1) to the RAM 160.

The access control circuit 140 transfers the context number (=2), the link context number and the sub-context information (1) of the task (1) held in the buffers (2-0) and (2-1) to the buffers (3-0) and (3-1) (shift rightward). The context information (2) of the task (1) held in the buffer (2-2) is discarded.

The access control circuit 140 transfers the context number (=3), the link context number and the sub-context information (1), (2) of the task (3) held in the buffers (1-0), (1-1), and (1-2) to the buffers (2-0), (2-1), and (2-2) (shift rightward). The context information (3) of the task (3) held in the buffer (1-3) is discarded.

The access control circuit 140 writes the context number (=4) in the buffer (1-0). The access control circuit 140 writes the link context number and the sub-context information (1) to (3) of the task (4) in the buffers (1-1), (1-2), and (1-3). The access control circuit 140 transfers the data of the buffers (1-0), (1-1), (1-2), and (1-3) to the RAM 160 through the internal bus BS 4 in one or a plurality of cycles.

<Context Return>

The access control circuit 140 executes the following when a context number identifying context information to be returned matches any of the context numbers stored in the buffer group 150 upon receiving a request to restore the context information evacuated by the interrupt. The access control circuit 140 transfers the context information to be retuned stored in the buffer group 150 to the CPU 130, and deletes the context data written after the context information to be returned stored in the buffer group 150.

Figure 26:
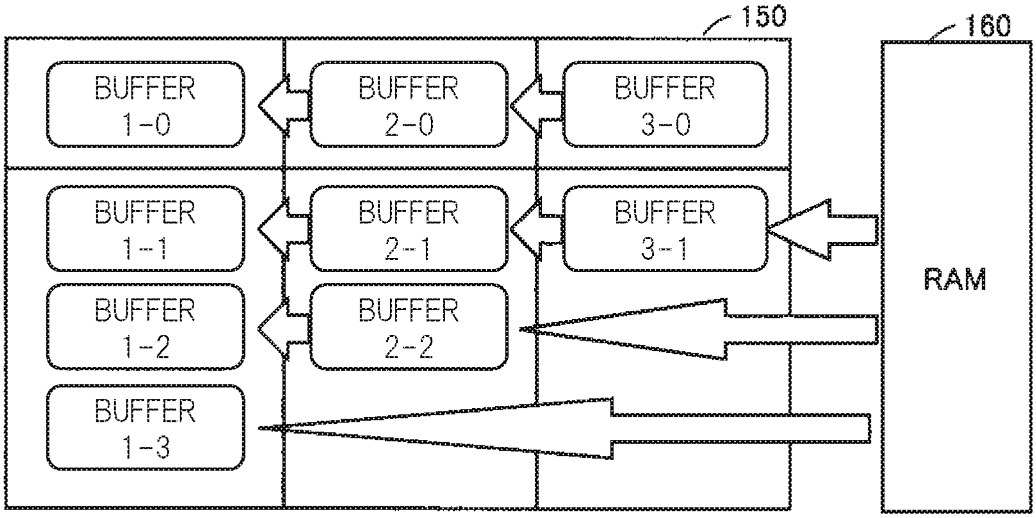
FIG. 26 is a diagram for explaining buffer control when the context is returned to the context according to the fifth embodiment.
Figure 27:
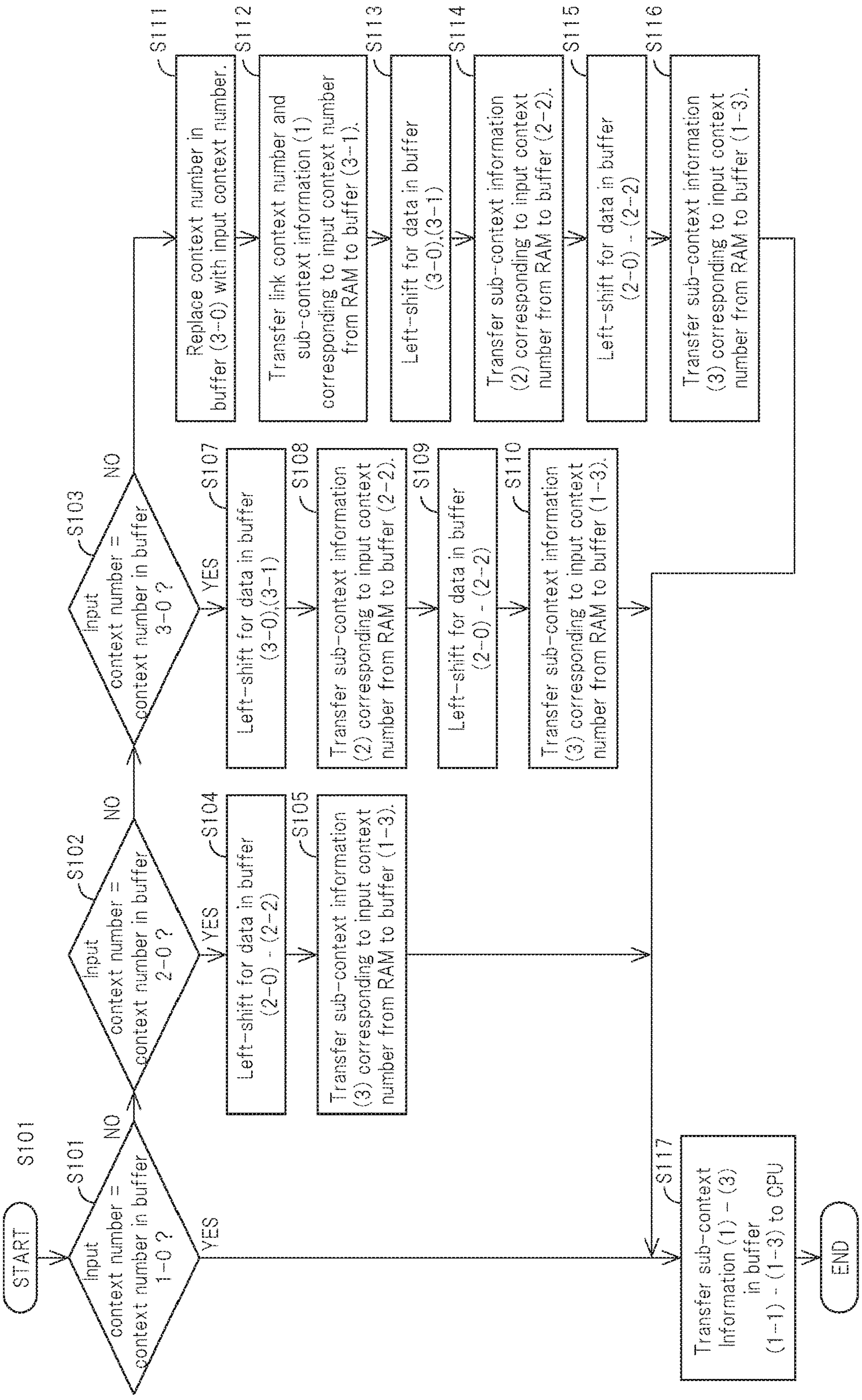
FIG. 27 is a flow chart illustrating a process procedure for context restoration according to the fifth embodiment.

FIG. 26 is a diagram for explaining buffer control at the time of context return according to the fifth embodiment. FIG. 27 is a flowchart showing a context return procedure according to the fifth embodiment.

In step S101, when the context number transferred to the access control circuit 140 via the bus BS 1 matches the context number held in the buffer 1-0, the process proceeds to step S117.

In step S102, when the context number transferred to the access control circuit 140 via the bus BS 1 matches the context number held in the buffer 2-0, the process proceeds to step S104.

In step S103, when the context number transferred to the access control circuit 140 via the bus BS 1 matches the context number held in the buffer 3-0, the process proceeds to step S107.

When the context number transferred to the access control circuit 140 via the bus BS 1 does not match any of the context numbers held in the buffer (1-0), the buffer (2-0) or the buffer (3-0), the process proceeds to step S111.

In step S104, the access control circuit 140 shifts the data of the buffers (2-0) to (2-2) to the left. As a result, the context data of the buffers (1-0) to (1-2) written after the context data of the buffers (2-0) to (2-2) are deleted and replaced with the context data of the buffers (2-0) to (2-2).

In step S105, the access control circuit 140 causes the RAM 160 to transmit the sub-context information (3) corresponding to the transferred context number to the buffer (1-3) through the inner bus BS 4.

In step S107, the access control circuit 140 shifts the data of the buffers (3-0) to (3-1) to the left. As a result, the context data of the buffers (2-0) to (2-1) written after the context data of the buffers (3-0) to (3-1) are deleted and replaced with the context data of the buffers (3-0) to (3-1).

In step S108, the access control circuit 140 causes the RAM 160 to transfer the sub-context information (2) corresponding to the transferred context number to the buffer (2-2) through the inner bus BS 4.

In step S109, the access control circuit 140 shifts the data of the buffers (2-0) to (2-2) to the left. As a result, the context data of the buffers (1-0) to (1-2) written after the context data of the buffers (2-0) to (2-2) are deleted and replaced with the context data of the buffers (2-0) to (2-2).

In step S110, the access control circuit 140 transfers the sub-context information (3) of the transferred context number from the RAM 160 to the buffer (1-3) through the inner bus BS4.

In step S111, the access control circuit 140 replaces the context number of the buffer 3-0 with the transferred context number.

In operation S112, the access control circuit 140 transfers the link context number and the sub-context information (1) corresponding to the transferred context number from the RAM 160 to the buffer (3-1) via the internal bus BS 4.

In step S113, the access control circuit 140 shifts the data of the buffers (3-0) to (3-1) to the left. As a result, the context data of the buffers (2-0) to (2-1) written after the context data of the buffers (3-0) to (3-1) are deleted and replaced with the context data of the buffers (3-0) to (3-1).

In operation S114, the access control circuit 140 transfers the sub-context information (2) corresponding to the transferred context number from the RAM 160 to the buffer (2-2) via the internal bus BS 4.

In step S115, the access control circuit 140 shifts the data of the buffers (2-0) to (2-2) to the left. As a result, the context data of the buffers (1-0) to (1-2) written after the context data of the buffers (2-0) to (2-2) are deleted and replaced with the context data of the buffers (2-0) to (2-2).

In operation S116, the access control circuit 140 transfers the sub-context information (3) corresponding to the transferred context number from the RAM 160 to the buffers (1-3) through the internal bus BS 4.

In operation S117, the access control circuit 140 transfers the sub-context information (1) to (3) of the buffers (1-1) to (1-3) to the CPU 130 in one cycle through the bus BS 2.

<Prefetch>

In the prefetch after the context return, the access control circuit 140 causes the amount of data of the context information of the task having the context number corresponding to the link context number of the context information transferred to the CPU 130 by the context return to be larger than the amount of data of the context information of the other tasks. To this end, the access control circuit 140 transfers the data including all and part of the context information and the link context numbers about the plurality of tasks in the RAM 160 to the buffer group 150 through the internal bus BS 4.

Figure 28:
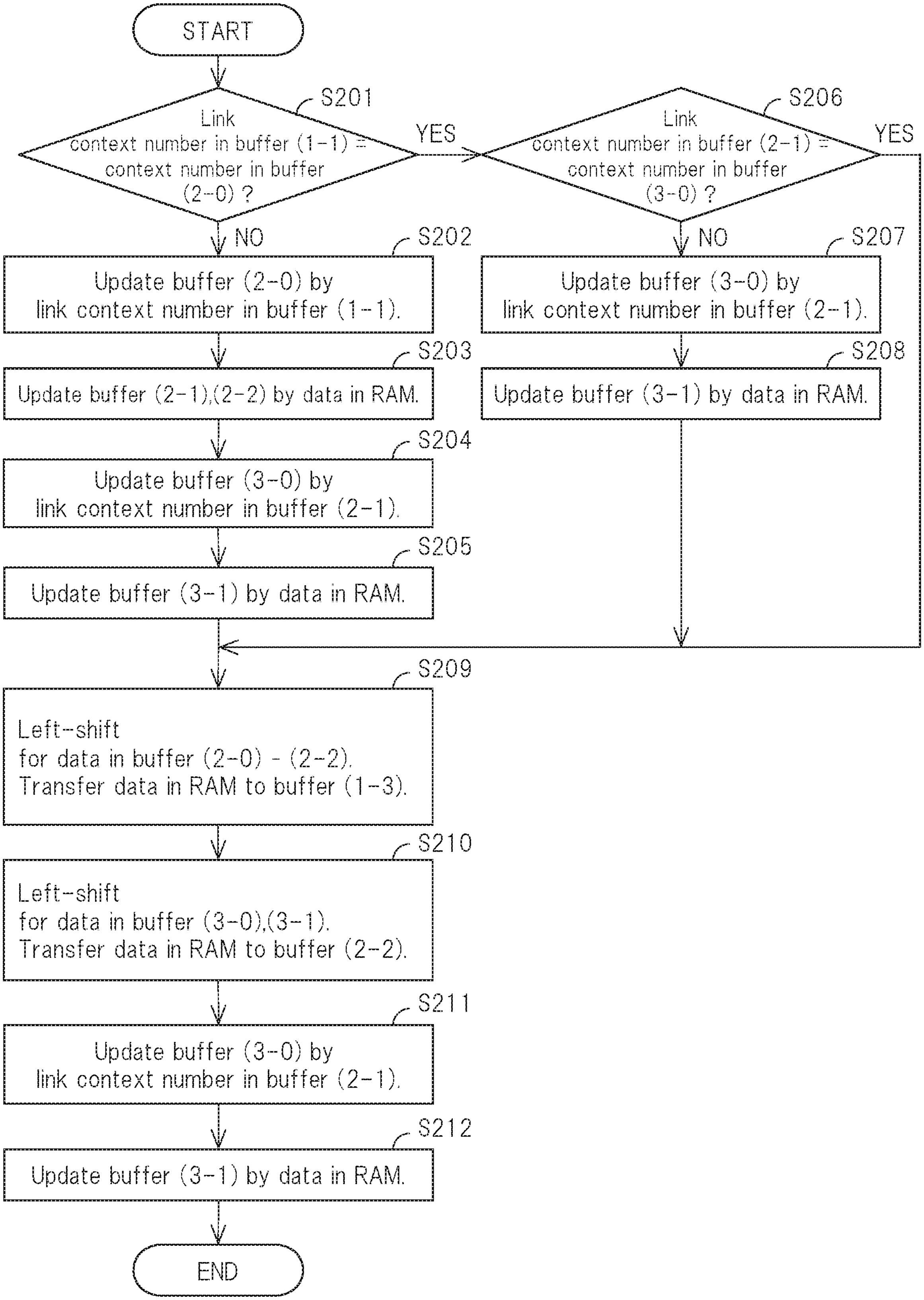
FIG. 28 is a flow chart illustrating a processing procedure of a prefetch according to the fifth embodiment.

FIG. 28 is a flowchart showing a prefetch processing procedure according to the fifth embodiment. In step S201, when the link context number held in the buffer (1-1) matches the context number held in the buffer (2-0), the process proceeds to step S201. If they do not match, the process proceeds to step S202.

In step S206, when the link context number held in the buffer (2-1) matches the context number held in the buffer (3-0), the process proceeds to step S209. If they do not match, the process proceeds to step S207.

In step S202, the access control circuit 140 updates the context number held in the buffer (2-0) with the link context number held in the buffer (1-1).

In S203, the access control circuit 140 transfers the link context number and the sub-context information (1) and (2) stored in the RAM 160 to the buffer (2-1) and the buffer (2-2) in response to the updated context number held in the buffer (2-0).

In step S204, the access control circuit 140 updates the context number held in the buffer (3-0) with the link context number held in the buffer (2-1).

In step S206, the access control circuit 140 transfers the link context number and the sub-context information (1) stored in the RAM 160 to the buffer (3-1) in response to the updated context number held in the buffer (3-0).

In step S207, the access control circuit 140 updates the context number held in the buffer (3-0) with the link context number held in the buffer (2-1).

In step S208, the access control circuit 140 transfers the link context number and the sub-context information (1) stored in the RAM 160 to the buffer (3-1) in response to the updated context number held in the buffer (3-0).

After steps S205 and S208, step S209 is executed. In step S209, the access control circuit 140 transfers the data of the buffers (2-0) to (2-2) to the buffers (1-0) to (1-2) by a left-shift. The access control circuit 140 transfers the sub-context information (3) corresponding to the context number transferred to the buffer (1-0) from the RAM 160 to the buffer (1-3).

In step S210, the access control circuit 140 transfers the data of the buffers (3-0) to (3-1) to the buffers (2-0) to (2-1) by a left-shift. The access control circuit 140 transfers the sub-context information (2) corresponding to the context number transferred to the buffer (2-0) from the RAM 160 to the buffer (2-2).

In step S211, the access control circuit 140 updates the context number of the buffer (3-0) with the link context number of the buffer (2-1).

In operation S212, the access control circuit 140 transfers the link context number and the sub-context information (1) stored in the RAM 160 to the buffer (3-1) in response to the updated context number held in the buffer (3-0).

As described above, according to the present embodiment, when multiple interrupts occur, it is possible to increase the possibility that the recovery time can be shortened by storing more sub-context information of a task stopped at a later timing in the buffer group than other tasks.

The invention made by the present inventor has been described above in detail based on the embodiment, but the present invention is not limited to the embodiment, and it is needless to say that various modifications can be made without departing from the gist thereof.

What is claimed is:

1. A memory module comprising:

a first storage unit coupled to a central processing unit (CPU) through a first bus having a first bit width;

a second storage unit coupled to the first storage unit through a second bus having a bit width smaller than the first bit width; and an access control circuit that writes, into the first storage unit when a request to save context information of a task is received by an interrupt, 1) context information transferred from the CPU in one cycle through the first bus, 2) a context number identifying the context information, and 3) a link context number being a context number identifying context information transferred from the CPU to the first storage unit at a time of a previous interrupt, wherein after writing into the first storage unit, the access control circuit 1) corresponds data comprising the context information and the link context number stored in the first storage unit to the context number, and 2) transfers the data to an address of the second storage unit through the second bus in a plurality of cycles.

2. The memory module according to claim 1, wherein when the access control circuit receives a request to restore context information saved by an interrupt and a context number identifying the context information to be restored matches a context number stored in the first storage unit, the access control circuit transfers the context information identified by the context number stored in the first storage unit to the CPU in one cycle through the first bus.

3. The memory module of claim 2, wherein when the access control circuit receives the request and the context number identifying the context information to be returned does not match the context number stored in the first storage unit, the access control circuit updates the context number of the first storage unit with the context number identifying the context information to be returned, and transfers data including the context information and the link context number stored in the second storage unit corresponding to the updated context number to the first storage unit in a plurality of cycles through the second bus, and then transfers the context information transferred to the first storage unit to the CPU in one cycle through the first bus.

4. The memory module according to claim 3, wherein the access control circuit transfers data including context information and a link context number stored in the second storage unit corresponding to the link context number stored in the first storage unit to the first storage unit in a plurality of cycles through the second bus in a prefetch after the restore.

5. The memory module of claim 1, wherein the access control circuit updates the link context number with the context number when the access control circuit receives a request to save context information by the interrupt and a context number stored in the first storage unit before receiving the request is not a predetermined invalid value.

6. The memory module according to claim 1, further comprising:

a third storage unit coupled to the CPU through the first bus, wherein when the access control circuit receives a request to save context information by an interrupt and a context number stored in the third storage unit is a predetermined invalid value, the context information transferred from the CPU through the first bus in one cycle and the context number identifying the context information is further stored in the third storage unit.

7. The memory module according to claim 6, wherein when the access control circuit receives the request to save and a context number stored in the third storage unit matches the context number identifying the context information to be saved, the context information transferred from the CPU in one cycle through the first bus is further stored in the third storage unit.

8. The memory module according to claim 7, wherein when the access control circuit receives a request to restore context information saved by an interrupt and a context number identifying context information to be restored matches a context number stored in the third storage unit, context information stored in the third storage unit is transferred to the CPU in one cycle through the first bus.

9. The memory module according to claim 8, wherein when the access control circuit receives a request to restore context information saved by an interrupt and a context number identifying context information to be restored does not match a context number stored in the third storage unit and matches a context number stored in the first storage unit, context information stored in the first storage unit is transferred to the CPU in one cycle through the first bus.

10. The memory module according to claim 9, wherein when the access control circuit receives a request to restore context information saved by an interrupt and a context number identifying context information to be restored does not match a context number stored in the third storage unit and does not match a context number stored in the first storage unit, data including the context information and the link context number stored in the second storage unit is transferred to the first storage unit in a plurality of cycles through the second bus in association with the context number identifying the context information to be restored, and then transfers the context information transferred to the first storage unit to the CPU in one cycle through the first bus.

11. The memory module according to claim 10, wherein the access control circuit transfers data including context information and a link context number stored in the second storage unit to the first storage unit through the second bus in a plurality of cycles when the link context number stored in the first storage unit does not match the context number stored in the third storage unit in a prefetch after the restore.

12. The memory module of claim 1, wherein the first storage unit is configured to store context data consisting of context information, a context number identifying the context information, and a link context number identifying context information transferred at the time of a previous interrupt, for tasks stopped at each of a plurality of interrupts, and wherein the access control circuit transfers data including part or all of context information and the link context numbers for a plurality of tasks stored in the second storage unit to the first storage unit via the second bus so that a data amount of context information of the highest priority task in the first storage unit is greater than the data amount of context information of other tasks in a prefetch.

13. The memory module of claim 1, wherein the CPU and the second storage unit are coupled by a third bus having a bit width smaller than the first bit width, wherein data having a second bit width of the context information is transferred between the CPU and the second storage unit in one cycle through the third bus, and wherein data of the context information excluding the data having the second bit width is transferred between the CPU and the first storage unit in one cycle through the first bus.

14. A memory module comprising:

a first storage unit coupled to a central processing unit (CPU) through a first bus having a first bit width, wherein the first storage unit is configured to store context data including 1) context information, 2) a context number identifying the context information, and 3) a link context number being a context number identifying context information transferred from the CPU at a time of a previous interrupt, for each of tasks which have stopped execution by each of a plurality of interrupts;

a second storage unit coupled to the first storage unit through a second bus having a bit width smaller than the first bit width; and an access control circuit, wherein, when a request to save context information of a task is received by an interrupt and when the first storage unit does not have an area for storing latest context data including 1) context information transferred from the CPU through the first bus in a one cycle, 2) a context number identifying the context information, and 3) a link context number being a context number identifying context information transferred from the CPU to the first storage unit at a time of a previous interrupt, the access control unit deletes at least a part of context data already stored in the first storage unit, and then writes the latest context data to the first storage unit, and wherein the access control circuit transfers the latest context data stored in the first storage unit to the second storage unit through the second bus in one or more cycles.

15. The memory module of claim 14, wherein when the access control circuit receives a request to restore context information saved by an interrupt and a context number identifying context information to be restored matches any of the context numbers stored in the first storage unit, the access control circuit transfers the context information to be restored stored in the first storage unit to the CPU, and deletes context data written later than the context information to be restored stored in the first storage unit from the first storage unit.

16. The memory module according to claim 15, wherein the access control circuit transfers data including a part or all of the context information about a plurality of tasks and the link context number stored in the second storage unit to the first storage unit through the second bus so that a data amount of the context information of a task having a context number corresponding to the link context number of the context information transferred to the CPU by the restore becomes larger than a data amount of the context information of another task in a prefetch after the restore.

* * * * *